United States Patent
Harrold et al.

(10) Patent No.: US 12,140,847 B2
(45) Date of Patent: *Nov. 12, 2024

(54) DISPLAY APPARATUS USING APPLICATION SOFTWARE CONTEXT FOR PRIVACY CONTROL

(71) Applicant: RealD Spark, LLC, Beverly Hills, CA (US)

(72) Inventors: Jonathan Harrold, Leamington Spa (GB); Robert A. Ramsey, Boulder, CO (US); Michael G. Robinson, Boulder, CO (US); Graham J. Woodgate, Henley-on-Thames (GB)

(73) Assignee: RealD Spark, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,063

(22) Filed: Aug. 3, 2021

(65) Prior Publication Data

US 2022/0091455 A1 Mar. 24, 2022

Related U.S. Application Data

(63) Continuation of application No. 16/591,105, filed on Oct. 2, 2019, now Pat. No. 11,106,103.

(Continued)

(51) Int. Cl.
*G02F 1/137* (2006.01)
*G02F 1/13* (2006.01)
*G02F 1/1335* (2006.01)

(52) U.S. Cl.
CPC ........ *G02F 1/13725* (2013.01); *G02F 1/1323* (2013.01); *G02F 1/133509* (2013.01); *G02F 1/13712* (2021.01)

(58) Field of Classification Search
CPC .... G02F 1/137; G02F 1/13712; G02F 1/1323; G02F 1/133509
See application file for complete search history.

(56) References Cited

U.S. PATENT DOCUMENTS 3,914,022 A 10/1975 Kashnow
4,059,916 A 11/1977 Tachihara et al.
(Continued)

FOREIGN PATENT DOCUMENTS

CA 2222313 A1 6/1998
CN 1125943 C 10/2003
(Continued)

OTHER PUBLICATIONS

Adachi, et al. "P-228L: Late-News Poster: Controllable Viewing-Angle Displays using a Hybrid Aligned Nematic Liquid Crystal Cell", ISSN, SID 2006 Digest, pp. 705-708.
(Continued)

*Primary Examiner* — Kwang-Su Yang
(74) *Attorney, Agent, or Firm* — Penny L. Lowry

(57) ABSTRACT

A control system for a switchable privacy display apparatus comprises sensors arranged to determine device location, operating environment, document type, application type and further comprises a privacy policy for control of privacy images. High image visibility is provided for public mode operation while in privacy mode a high visual security level may be obtained by means of control of image luminance, contrast and white point in response to the privacy policy.

14 Claims, 23 Drawing Sheets

Related U.S. Application Data

(60) Provisional application No. 62/789,049, filed on Jan. 7, 2019, provisional application No. 62/740,586, filed on Oct. 3, 2018.

(56) References Cited

U.S. PATENT DOCUMENTS

| | | |
|---|---|---|
| 4,586,790 A | 5/1986 | Umeda et al. |
| 4,621,898 A | 11/1986 | Cohen |
| 4,974,941 A | 12/1990 | Gibbons et al. |
| 5,005,108 A | 4/1991 | Pristash et al. |
| 5,035,491 A | 7/1991 | Kawagishi et al. |
| 5,126,882 A | 6/1992 | Oe et al. |
| 5,579,139 A | 11/1996 | Abileah et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,726,729 A | 3/1998 | Takei |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,852,509 A | 12/1998 | Coleman |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 6,752,505 B2 | 6/2004 | Parker et al. |
| 6,987,550 B2 | 1/2006 | Takato et al. |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,228,476 B2 | 7/2012 | Shibazaki |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 9,798,169 B2 | 10/2017 | Su et al. |
| 9,939,675 B2 | 4/2018 | Peng et al. |
| 10,054,732 B2 | 8/2018 | Robinson et al. |
| 10,067,726 B2 | 9/2018 | Wakamoto et al. |
| 10,126,575 B1 | 11/2018 | Robinson et al. |
| 10,146,093 B2 | 12/2018 | Sakai et al. |
| 10,216,018 B2 | 2/2019 | Fang et al. |
| 10,288,914 B2 | 5/2019 | Chung et al. |
| 10,303,030 B2 | 5/2019 | Robinson et al. |
| 10,401,638 B2 | 9/2019 | Robinson et al. |
| 10,424,232 B2 | 9/2019 | Schubert et al. |
| 10,488,705 B2 | 11/2019 | Xu et al. |
| 10,527,775 B2 | 1/2020 | Yang et al. |
| 10,627,670 B2 | 4/2020 | Robinson et al. |
| 10,649,248 B1 | 5/2020 | Jiang et al. |
| 10,649,259 B2 | 5/2020 | Lee et al. |
| 10,712,608 B2 | 7/2020 | Robinson et al. |
| 10,802,356 B2 | 10/2020 | Harrold et al. |
| 10,935,714 B2 | 3/2021 | Woodgate et al. |
| 10,948,648 B2 | 3/2021 | Ihas et al. |
| 10,976,578 B2 | 4/2021 | Robinson et al. |
| 11,016,341 B2 | 5/2021 | Robinson et al. |
| 11,070,791 B2 | 7/2021 | Woodgate et al. |
| 11,079,645 B2 | 8/2021 | Harrold et al. |
| 11,079,646 B2 | 8/2021 | Robinson et al. |
| 11,092,851 B2 | 8/2021 | Robinson et al. |
| 11,092,852 B2 | 8/2021 | Robinson et al. |
| 11,099,433 B2 | 8/2021 | Robinson et al. |
| 11,099,447 B2 | 8/2021 | Woodgate et al. |
| 11,099,448 B2 | 8/2021 | Woodgate et al. |
| 11,237,417 B2 | 2/2022 | Woodgate et al. |
| 11,327,358 B2 | 5/2022 | Robinson et al. |
| 11,340,482 B2 | 5/2022 | Robinson et al. |
| 11,366,358 B2 | 6/2022 | Wu et al. |
| 11,442,316 B2 | 9/2022 | Woodgate et al. |
| 11,573,437 B2 | 2/2023 | Woodgate et al. |
| 11,892,717 B2 | 2/2024 | Harrold et al. |
| 11,977,286 B2 | 5/2024 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0140342 A1 | 10/2002 | Sundahl |
| 2002/0163790 A1 | 11/2002 | Yamashita et al. |
| 2002/0171793 A1 | 11/2002 | Sharp et al. |
| 2003/0030764 A1 | 2/2003 | Lee |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0169499 A1 | 9/2003 | Bourdelais et al. |
| 2003/0214615 A1 | 11/2003 | Colgan et al. |
| 2003/0222857 A1 | 12/2003 | Abileah |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0223094 A1 | 11/2004 | Hamada et al. |
| 2004/0240777 A1 | 12/2004 | Woodgate et al. |
| 2004/0246418 A1 | 12/2004 | Kumagai et al. |
| 2004/0264910 A1 | 12/2004 | Suzuki et al. |
| 2005/0002174 A1 | 1/2005 | Min et al. |
| 2005/0014913 A1 | 1/2005 | Kim et al. |
| 2005/0041311 A1 | 2/2005 | Mi et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0206814 A1 | 9/2005 | Histake |
| 2005/0213348 A1 | 9/2005 | Parikka et al. |
| 2005/0219693 A1 | 10/2005 | Hartkop et al. |
| 2005/0243265 A1 | 11/2005 | Winlow et al. |
| 2005/0259193 A1 | 11/2005 | Sumiyoshi et al. |
| 2005/0259205 A1 | 11/2005 | Sharp et al. |
| 2005/0270798 A1 | 12/2005 | Lee et al. |

(56) References Cited

U.S. PATENT DOCUMENTS

| | | |
|---|---|---|
| 2006/0050209 A1 | 3/2006 | Higa |
| 2006/0066785 A1 | 3/2006 | Moriya |
| 2006/0082702 A1 | 4/2006 | Jacobs et al. |
| 2006/0092512 A1 | 5/2006 | Shioya |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262255 A1 | 11/2006 | Wang et al. |
| 2006/0262258 A1 | 11/2006 | Wang et al. |
| 2006/0262376 A1 | 11/2006 | Mather et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0008471 A1 | 1/2007 | Wang et al. |
| 2007/0024970 A1 | 2/2007 | Lub et al. |
| 2007/0030240 A1 | 2/2007 | Sumiyoshi et al. |
| 2007/0035964 A1 | 2/2007 | Olczak |
| 2007/0040780 A1 | 2/2007 | Gass et al. |
| 2007/0047254 A1 | 3/2007 | Schardt et al. |
| 2007/0064163 A1 | 3/2007 | Tan et al. |
| 2007/0076406 A1 | 4/2007 | Kodama et al. |
| 2007/0139772 A1 | 6/2007 | Wang |
| 2007/0223251 A1 | 9/2007 | Liao |
| 2007/0268427 A1 | 11/2007 | Uehara |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0106689 A1 | 5/2008 | Inoue et al. |
| 2008/0117364 A1 | 5/2008 | Matsushima |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2009/0009894 A1 | 1/2009 | Chuang |
| 2009/0021657 A1 | 1/2009 | Yang et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109381 A1 | 4/2009 | Haruyama |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213147 A1 | 8/2009 | Sagardoyburu et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0014313 A1 | 1/2010 | Tillin et al. |
| 2010/0066960 A1 | 3/2010 | Smith et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0187704 A1 | 7/2010 | Hsu et al. |
| 2010/0205667 A1 | 8/2010 | Anderson et al. |
| 2010/0214324 A1* | 8/2010 | Broughton ............ G09G 3/3648 345/60 |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032437 A1 | 2/2011 | Yoshimi et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0020078 A1 | 1/2012 | Chang |
| 2012/0086875 A1 | 4/2012 | Yokota |
| 2012/0086893 A1 | 4/2012 | Ou et al. |
| 2012/0113158 A1 | 5/2012 | Goto et al. |
| 2012/0120351 A1 | 5/2012 | Kawata |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0170315 A1 | 7/2012 | Fan et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Mnther et al. |
| 2013/0050610 A1 | 2/2013 | Parry-Jones et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0120817 A1 | 5/2013 | Yoon et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308185 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1 | 4/2014 | Nakahara et al. |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0185322 A1 | 7/2014 | Liao |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0313464 A1 | 10/2014 | Li et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0029449 A1 | 1/2015 | Woo et al. |
| 2015/0035872 A1 | 2/2015 | Shima et al. |
| 2015/0055366 A1 | 2/2015 | Chang et al. |
| 2015/0088284 A1 | 3/2015 | Hendricks et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |

(56) References Cited

U.S. PATENT DOCUMENTS

| | | |
|---|---|---|
| 2015/0293409 A1 | 10/2015 | Usukura et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0154458 A1 | 6/2016 | Liu et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0291358 A1 | 10/2016 | Kikuchi et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0023725 A1 | 1/2017 | Oki et al. |
| 2017/0031206 A1 | 2/2017 | Smith et al. |
| 2017/0085869 A1 | 3/2017 | Choi et al. |
| 2017/0090103 A1 | 3/2017 | Holman |
| 2017/0090237 A1 | 3/2017 | Kim et al. |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0210253 A1 | 7/2018 | Kashima |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0056628 A1 | 2/2019 | Inokuchi |
| 2019/0086706 A1 | 3/2019 | Robinson et al. |
| 2019/0121173 A1 | 4/2019 | Robinson et al. |
| 2019/0146134 A1 | 5/2019 | Miura et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0331944 A1 | 10/2019 | Fang et al. |
| 2019/0339433 A1 | 11/2019 | Benoit et al. |
| 2019/0353944 A1 | 11/2019 | Acreman et al. |
| 2019/0361165 A1 | 11/2019 | Chang et al. |
| 2020/0019006 A1 | 1/2020 | Robinson et al. |
| 2020/0026114 A1 | 1/2020 | Harrold et al. |
| 2020/0026125 A1 | 1/2020 | Robinson et al. |
| 2020/0041839 A1 | 2/2020 | Robinson et al. |
| 2020/0110301 A1 | 4/2020 | Harrold et al. |
| 2020/0132904 A1 | 4/2020 | Smith et al. |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2020/0409156 A1 | 12/2020 | Sissom et al. |
| 2021/0018773 A1 | 1/2021 | Woodgate et al. |
| 2021/0033898 A1 | 2/2021 | Woodgate et al. |
| 2021/0072448 A1 | 3/2021 | Peng et al. |
| 2021/0116627 A1 | 4/2021 | Tsuji |
| 2021/0149233 A1 | 5/2021 | Robinson et al. |
| 2021/0149234 A1 | 5/2021 | Woodgate et al. |
| 2021/0271121 A1 | 9/2021 | Woodgate et al. |
| 2021/0333577 A1 | 10/2021 | Robinson et al. |
| 2021/0333580 A1 | 10/2021 | Matsushima |
| 2021/0341769 A1 | 11/2021 | Woodgate et al. |
| 2021/0373382 A1 | 12/2021 | Sakai et al. |
| 2022/0269128 A1 | 8/2022 | Matsushima |
| 2022/0404540 A1 | 12/2022 | Robinson et al. |
| 2022/0413338 A1 | 12/2022 | Matsushima et al. |
| 2023/0099000 A1 | 3/2023 | Harrold et al. |
| 2023/0254457 A1 | 8/2023 | Robinson et al. |
| 2023/0375863 A1 | 11/2023 | Woodgate et al. |

FOREIGN PATENT DOCUMENTS

| | | |
|---|---|---|
| CN | 1690800 A | 11/2005 |
| CN | 1776484 A | 5/2006 |
| CN | 101042449 A | 9/2007 |
| CN | 101256251 A | 9/2008 |
| CN | 101435952 A | 5/2009 |
| CN | 101454712 A | 6/2009 |
| CN | 101518095 A | 8/2009 |
| CN | 101681061 A | 3/2010 |
| CN | 102540544 A | 7/2012 |
| CN | 103109226 A | 5/2013 |
| CN | 103473494 A | 12/2013 |
| CN | 103688211 A | 3/2014 |
| CN | 103988121 A | 8/2014 |
| CN | 104133292 A | 11/2014 |
| CN | 104303085 A | 1/2015 |
| CN | 104321686 A | 1/2015 |
| CN | 104380177 A | 2/2015 |
| CN | 104597661 A | 5/2015 |
| CN | 204740413 U | 11/2015 |
| CN | 105842909 A | 8/2016 |
| CN | 105960609 A | 9/2016 |
| CN | 106104372 A | 11/2016 |
| CN | 106415342 A | 2/2017 |
| CN | 106557711 A | 4/2017 |
| CN | 107102460 A | 8/2017 |
| CN | 209171779 U | 7/2019 |
| EP | 1326102 A1 | 7/2003 |
| EP | 1060344 B1 | 5/2004 |
| EP | 1956423 A1 | 8/2008 |
| EP | 2037318 A1 | 3/2009 |
| GB | 2405542 A | 3/2005 |
| GB | 2415850 A | 1/2006 |
| GB | 2418518 A | 3/2006 |
| GB | 2428100 A | 1/2007 |
| GB | 2428345 A | 1/2007 |
| GB | 2482065 A | 1/2012 |

(56) References Cited

FOREIGN PATENT DOCUMENTS

| | | |
|---|---|---|
| GB | 2486935 B | 9/2013 |
| JP | S58143305 A | 8/1983 |
| JP | H01130783 U | 9/1989 |
| JP | H09197405 A | 7/1997 |
| JP | H10268251 A | 10/1998 |
| JP | H11174489 A | 7/1999 |
| JP | 2005316470 A | 11/2005 |
| JP | 2005345799 A | 12/2005 |
| JP | 2006139160 A | 6/2006 |
| JP | 2006201326 A | 8/2006 |
| JP | 2006330164 A | 12/2006 |
| JP | 2007501966 A | 2/2007 |
| JP | 2007148279 A | 6/2007 |
| JP | 2007273288 A | 10/2007 |
| JP | 2008310271 A | 12/2008 |
| JP | 2009020293 A | 1/2009 |
| JP | 2011095719 A | 5/2011 |
| JP | 2011103241 A | 5/2011 |
| JP | 2013160818 A | 8/2013 |
| JP | 2014032953 A | 2/2014 |
| JP | 2014099363 A | 5/2014 |
| KR | 20090106062 A | 10/2009 |
| KR | 20090108231 A | 10/2009 |
| KR | 20120011228 A | 2/2012 |
| KR | 101227145 B1 | 2/2013 |
| KR | 20130046116 A | 5/2013 |
| KR | 1020150021937 A | 3/2015 |
| KR | 20160053264 A | 5/2016 |
| KR | 1020170013915 A | 2/2017 |
| KR | 1020170019006 A | 2/2017 |
| KR | 1020170040565 A | 4/2017 |
| KR | 101990286 B1 | 6/2019 |
| TW | M537663 U | 3/2017 |
| TW | 1612360 B | 1/2018 |
| WO | 2005071449 A2 | 8/2005 |
| WO | 2005071474 A2 | 8/2005 |
| WO | 2006030702 A1 | 3/2006 |
| WO | 2008001896 A1 | 1/2008 |
| WO | 2008078764 A1 | 7/2008 |
| WO | 2008093445 A1 | 8/2008 |
| WO | 2009008406 A1 | 1/2009 |
| WO | 2009011199 A1 | 1/2009 |
| WO | 2010021926 A2 | 2/2010 |
| WO | 2010101141 A1 | 9/2010 |
| WO | 2010143705 A1 | 12/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2017065745 A1 | 4/2017 |
| WO | 2017117570 A1 | 7/2017 |
| WO | 2018003380 A1 | 1/2018 |
| WO | 2018035492 A1 | 2/2018 |
| WO | 2018178790 A1 | 10/2018 |
| WO | 2018208618 A1 | 11/2018 |
| WO | 2018221413 A1 | 12/2018 |
| WO | 2019055755 A1 | 3/2019 |
| WO | 2019067846 A1 | 4/2019 |
| WO | 2019090252 A1 | 5/2019 |
| WO | 2019147762 A1 | 8/2019 |
| WO | 2021003383 A1 | 1/2021 |

OTHER PUBLICATIONS

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.

CN201780030715.3 Notification of the First Office Action dated Jan. 21, 2020.
CN201880042320.X Notification of the First Office Action dated May 25, 2021.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
EP-18857077.4 Extended European Search Report of European Patent Office dated Jun. 16, 2021.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission," J. Soc. Inf. Display, vol. 12, Issue 4, pp. 379-387 (Dec. 2004).
PCT/US2016/058695 International search report and written opinion of the international searching authority mailed Feb. 28, 2017.
PCT/US2017/032734 International search report and written opinion of the international searching authority mailed Jul. 27, 2017.
PCT/US2018/031206 International search report and written opinion of the international searching authority mailed Jul. 20, 2018.
PCT/US2018/031218 International search report and written opinion of the international searching authority mailed Jul. 19, 2018.
PCT/US2018/051021 International search report and written opinion of the international searching authority mailed Nov. 21, 2018.
PCT/US2018/051027 International search report and written opinion of the international searching authority mailed Nov. 30, 2018.
PCT/US2018/053328 International search report and written opinion of the international searching authority mailed Nov. 30, 2018.
PCT/US2018/059249 International search report and written opinion of the international searching authority mailed Jan. 3, 2019.
PCT/US2018/059256 International search report and written opinion of the international searching authority mailed Jan. 3, 2019.
PCT/US2019/014889 International search report and written opinion of the international searching authority mailed May 24, 2019.
PCT/US2019/014902 International search report and written opinion of the international searching authority mailed Jun. 25, 2019.
PCT/US2019/023659 International search report and written opinion of the international searching authority mailed Jun. 10, 2019.
PCT/US2019/038409 International search report and written opinion of the international searching authority mailed Sep. 19, 2019.
PCT/US2019/038466 International search report and written opinion of the international searching authority mailed Nov. 5, 2019.
PCT/US2019/042027 International search report and written opinion of the international searching authority mailed Oct. 15, 2019.
PCT/US2019/054291 International search report and written opinion of the international searching authority mailed Jan. 6, 2020.
PCT/US2019/059990 International search report and written opinion of the international searching authority mailed Feb. 28, 2020.
PCT/US2019/066208 International search report and written opinion of the international searching authority mailed Feb. 27, 2020.
PCT/US2020/017537 International search report and written opinion of the international searching authority mailed Apr. 29, 2020.
PCT/US2020/040686 International search report and written opinion of the international searching authority mailed Nov. 20, 2020.
PCT/US2020/044574 International search report and written opinion of the international searching authority mailed Oct. 21, 2020.
PCT/US2020/053863 International search report and written opinion of the international searching authority mailed Mar. 12, 2021.
PCT/US2020/060155 International search report and written opinion of the international searching authority mailed Feb. 5, 2021.
PCT/US2020/060191 International search report and written opinion of the international searching authority mailed Feb. 8, 2021.
PCT/US2020/063638 International search report and written opinion of the international searching authority mailed Mar. 2, 2021.
PCT/US2020/064633 International search report and written opinion of the international searching authority mailed Mar. 15, 2021.

(56) References Cited

OTHER PUBLICATIONS

Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks for Large-Scale Image Recognition", ICLR 2015.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
Cheng, et al., "Fast-Response Liquid Crystal Variable Optical Retarder and Multilevel Attenuator," Optical Engineering 52 (10), 107105 (Oct. 16, 2013). (Year: 2013).
CN201680061632.6 Notification of the First Office Action dated Sep. 14, 2021.
CN201880073578.6 Notification of the First Office Action dated Aug. 27, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
PCT/US2021/029937 International search report and written opinion of the international searching authority mailed Aug. 6, 2021.
PCT/US2021/029944 International search report and written opinion of the international searching authority mailed Aug. 3, 2021.
PCT/US2021/029947 International search report and written opinion of the international searching authority mailed Aug. 10, 2021.
PCT/US2021/029954 International search report and written opinion of the international searching authority mailed Aug. 10, 2021.
PCT/US2021/029958 International search report and written opinion of the international searching authority mailed Aug. 10, 2021.
PCT/US2021/043435 International search report and written opinion of the international searching authority mailed Nov. 1, 2021.
PCT/US2021/043444 International search report and written opinion of the international searching authority mailed Nov. 1, 2021.
CN-201980020303.0—Notification of the First Office Action dated Dec. 16, 2021.
EP-19881483.2 Extended European Search Report of European Patent Office dated Aug. 5, 2022.
JP2020-509511 Non-Final Notice of Reasons for Rejection dated Jul. 19, 2022.
Nelkon et al., "Advanced Level Physics", Third edition with SI units, Heinemann Educational Books Ltd, London, 1970.
CN201980030279.9 Notification of the First Office Action dated Mar. 29, 2022.
EP-19825448.4 Extended European Search Report of European Patent Office dated Mar. 10, 2022.
JP2019-561773 Non-Final Notice of Reasons for Rejection dated Mar. 22, 2022.
Extended European Search Report of European Patent Office dated Sep. 19, 2022.
EP-20835231.0 Extended European Search Report of European Patent Office dated May 15, 2023.
PCT/US2023/012240 International search report and written opinion of the international searching authority mailed Apr. 27, 2023.
PCT/US2023/012243 International search report and written opinion of the international searching authority mailed May 10, 2023.
EP19771688.9 Notification of the First Office Action dated Mar. 6, 2023.
JP2020-550747 Non-Final Notice of Reasons for Rejection dated Mar. 29, 2023.
KR10-2020-7010753 Notice of Preliminary Rejection mailed Feb. 17, 2023.
CN-201880042320.X Notification of the Third Office Action from the Chinese Patent Office dated Dec. 30, 2022.
CN-201980082757.0 Notification of the 1st Office Action of the Chinese Patent Office mailed Dec. 5, 2022.
JP2020-540724 Non-Final Notice of Reasons for Rejection dated Jan. 4, 2023.
JP-2020-540797 Non-Final Notice of Reasons for Rejection from the Japan Patent Office mailed Dec. 6, 2022.
PCT/US2022/045030 International search report and written opinion of the international searching authority mailed Jan. 3, 2023.
Chiu, et al, "Advanced Hyoer-Viewing Angle Controllable LCD", 39-1 / M.-H. Chiu Invited Paper; AUO Technology Center, AU Optronics Corp., Hsinchu, Taiwan, SID 2021 Digest, ISSN 0097-996X/21/5202-0543, pp. 543-545.
EP-20851155.0 Extended European Search Report of European Patent Office dated Aug. 2, 2023.
PCT/US2023/017639 International search report and written opinion of the international searching authority mailed Jul. 6, 2023.
CN201980056000.4 Notification of the First Office Action dated Nov. 1, 2023.
CN201980056022.0 Notification of the First Office Action dated Oct. 23, 2023.
CN202080020818.3 Notification of the First Office Action dated Oct. 23, 2023.
CN202080059812.7 Notification of the First Office Action dated Oct. 19, 2023.
EP-20872625.7 Extended European Search Report of European Patent Office dated Sep. 20, 2023.
EP-20887527.8 Extended European Search Report of European Patent Office dated Nov. 20, 2023.
JP2021-518864 Non-Final Notice of Reasons for Rejection dated Oct. 24, 2023.
EP21795524.4 Extended European Search Report of European Patent Office dated Apr. 26, 2024.
EP21796016.0 Extended European Search Report of European Patent Office dated Apr. 29, 2024.
EP21849510.9 Extended European Search Report of European Patent Office dated Jun. 19, 2024.
Heber, "Switchable View Control using a Vertically Aligned Polarizer and Polarization Control", 31-2, siOPTICA GmbH, SID 2024 Digest, Jena, Germany, ISSN 0097-996X/24/5501, pp. 398-401.
JP2022-526302 Non-Final Notice of Reasons for Rejection dated Apr. 30, 2024.
CN202080089170.5 Notification of the First Office Action dated Apr. 7, 2024.
EP23218625.4 Extended European Search Report of European Patent Office dated Feb. 23, 2024.
JP2022-506340 Non-Final Notice of Reasons for Rejection dated Mar. 19, 2024.
EP-20887756.3 Extended European Search Report of European Patent Office dated Jan. 2, 2024.
EP-20898295.9 Extended European Search Report of European Patent Office dated Jan. 22, 2024.
IN202017035853 Hearing Notice dated Jan. 3, 2024.
KR10-2020-7024293 Notice of Preliminary Rejection mailed Dec. 7, 2023.
TW108140291 First Office Action dated Nov. 9, 2023.
CN201980056022.0 Notification of the Second Office Action dated Jul. 26, 2024.
CN202080079843.9 Notification of the First Office Action dated Jul. 18, 2024.
EP21849888.9 Extended European Search Report of European Patent Office dated Jul. 1, 2024.
KR10-2020-7024291 Notice of Preliminary Rejection mailed Jun. 13, 2024.
PCT/US2024/020519 International search report and written opinion of the international searching authority mailed Jun. 17, 2024.
PCT/US2024/025836 International search report and written opinion of the international searching authority mailed Jul. 23, 2024.

\* cited by examiner

Reflectivity

DISPLAY APPARATUS USING APPLICATION SOFTWARE CONTEXT FOR PRIVACY CONTROL

TECHNICAL FIELD

This disclosure generally relates to illumination from light modulation devices, and more specifically relates to control of privacy display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is incorporated by reference herein in its entirety.

In a known privacy display the privacy mode is provided by the addition of a removable louver film, such as marketed by 3M Corporation, which may not be fitted or removed by users reliably and therefore in practice, is not assiduously attached by the user every time they are outside the office. In another known privacy display the control of privacy mode is electronically activated but control is vested in the user who must execute a keystroke to enter privacy mode.

BRIEF SUMMARY

According to the present disclosure, there is provided a display apparatus comprising: a display device arranged to display an image and capable of operating in at least a public mode and a privacy mode, wherein the visibility of the image to an off-axis viewer is reduced in the privacy mode compared to the public mode; and the visibility of the image on-axis is maintained in the privacy mode; and a control system arranged to control the display device, the control system being capable of selectively operating the display device in the public mode or the privacy mode.

The privacy mode can be used in public places such as cafes or trains in order to enable the primary user to keep working but preventing onlookers or snoopers from being able to see or photograph data from the screen. The public mode can be used when discussing the contents on the screen with colleagues, for example within the corporate office.

The display apparatus may be arranged to connect to a network and the control system is arranged to selectively operate the display device in the public mode or the privacy mode in response to the nature of the network.

Advantageously the operation of the privacy mode may be independent of user preference such that organisations may be provided with control of exposure of private data when used in a public place without the consent of the user.

The display apparatus may be arranged to receive the identity of the user and the control system is arranged to selectively operate the display device in the public mode or the privacy mode in response to the received identity of the user. Advantageously the privacy operation of the display may be dependent on the identity of the user, so that an organisation may have control of use of public mode of operation of displayed data.

The display apparatus may comprise a location system arranged to detect the location of the display apparatus and the control system is arranged to selectively operate the display device in the public mode or the privacy mode in response to the detected location. Advantageously, privacy mode may be automatically configured in high risk locations, reducing risk of display of private data and increasing productivity of workers operating in public places.

The display apparatus may be capable of executing application software and the control system is arranged to selectively operate the display device in the public mode or the privacy mode in response to the context of the application software being executed. The display apparatus may be capable of executing application software for displaying a document, and the control system is arranged to selectively operate the display device in the public mode or the privacy mode in response to the content of the document and/or metadata associated with the document. Advantageously some high risk applications and data may be provided with increased Visual Security Level in comparison to low risk applications and data.

The display apparatus may be arranged to receive user input and the control system is arranged to selectively operate the display device in the public mode or the privacy mode in response to the received user input. Advantageously the user may override the privacy operation in allowed circumstances.

The display apparatus may comprise an ambient light sensor arrange to detect the level of the ambient light. The control system may be arranged to selectively operate the display device in the public mode or the privacy mode in response to the detected level of the ambient light. The control system may be arranged to selectively control any one or more of luminance, contrast, white point and spatial frequency of the image in the privacy mode in response to the detected level of the ambient light. The control system may be arranged to selectively control any one or more of luminance, contrast, white point and spatial frequency of the image in the public mode in response to the detected level of the ambient light. Advantageously the Visual Security Level of operation of the display may be optimised for the illuminated environment. Further image appearance to the primary user during privacy display operation may be increased in response to the type of private image displayed.

The control system may be arranged to selectively control the display apparatus to display information representing the visibility of the image to an off-axis viewer taking into account the detected level of the ambient light. Advantageously a display user may be provided with information regarding the visual security of the environment to achieve reliable decision making to view confidential data.

The control system may be arranged to control the display apparatus to display information representing changes to user-controllable parameters capable of reducing the visibility of the image to an off-axis viewer. The control system may be arranged to selectively control any one or more of luminance, contrast, white point and spatial frequency of the image in the privacy mode. Advantageously the Visual Security Level may be reduced while achieving comfortable viewing of image data for a primary user that is dependent on the user preference of image viewing.

The control system may be arranged to selectively control luminance of the displayed image in the public mode and the privacy mode in response to the detected level of the ambient light, using different transfer functions relating levels of luminance to detected levels of the ambient light in the public mode and in the privacy mode. The transfer function in the public mode may relate higher levels of luminance to detected levels of the ambient light than the transfer function in the privacy mode. Advantageously a high visual security level may be provided in privacy mode to snoopers for a wide range of ambient light conditions and a high image visibility may be provided in public mode to users for a wide range of ambient light conditions.

The control system may be arranged to selectively control luminance of the displayed image in the privacy mode in response to the detected level of the ambient light, in accordance with a transfer function that maintains a relationship $Y0/I \geq 1$ lux/nit, where $Y0$ is the maximum output luminance of the display apparatus measured in nits and $I$ is the detected ambient light level measured in lux. Advantageously high visual security level is observed for varying ambient light levels and desirable image visibility is provided to the display user.

The control system may be arranged to selectively control luminance of the displayed image in the privacy mode in response to the detected level of the ambient light, in accordance with a transfer function that maintains a relationship $Y0 \leq Y0_{lim}$ where $Y0_{lim}$ is given by the equation:

$$Y0_{lim} = \frac{R\theta + V_{lim} * K\theta}{(V_{lim} - 1) * P\theta}$$

where $V_{lim}$ has a value of 10, $R\theta$ is the reflected ambient illuminance at an observation angle $\theta$ of 45 degrees laterally and zero degrees in elevation from the normal to the display apparatus, $K\theta$ is the display black state luminance at the observation angle, and $P\theta$ is the relative luminance at the observation angle $\theta$ compared to the maximum display output luminance $Y0$.

The control system may be arranged to control the display apparatus to display information representing the visibility of the image to an off-axis viewer. Advantageously the Visual Security Level of the display apparatus may be optimised.

The display apparatus may be arranged to receive time data input and ambient light sensor input and the control system is arranged to selectively operate the display device in the public mode or the privacy mode in response to the received time input and ambient light sensor input in order to reduce light pollution generated by the display apparatus.

Advantageously at night time in a private location such as a bedroom, the light level and angular light output range may be reduced so that the display is less distracting to others in the environment.

The display apparatus may be arranged where the content and/or metadata includes the security status of the transfer protocol of the document and determining it to be Hypertext Transfer Protocol or Hypertext Transfer Protocol Secure.

Advantageously the display apparatus, when accessing a web page or similar document may use meta data associated with that document or associated with the transfer process, for example if it is set to be transferred using a secure or an open transfer protocol to determine if the display apparatus should be set to privacy mode and therefore maintain good data privacy.

In this document, public and privacy refer to the mode of the display rather than the nature of the location. For example privacy (display) mode is typically selected in public places such as coffee shops and public (display) mode is typically selected in private location such as at home.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1:
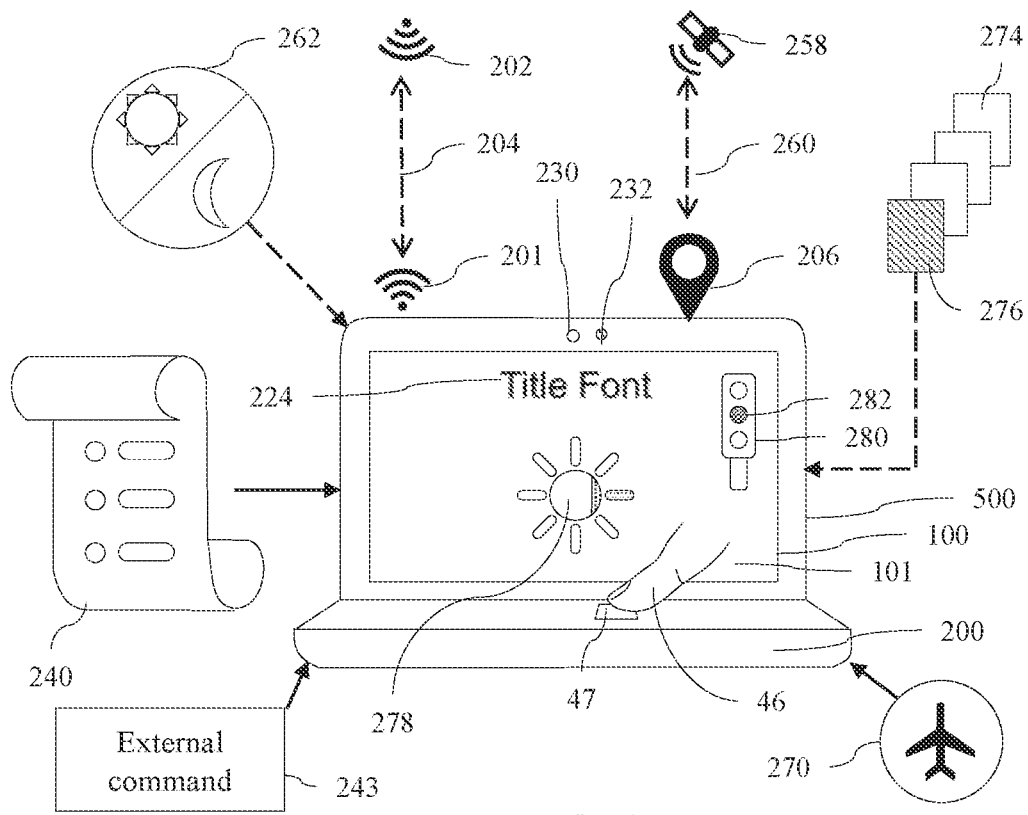
FIG. 1 is a schematic diagram illustrating a front view of a privacy display comprising a privacy control system operating in privacy mode with a first visual security level.

Terms related to privacy display appearance will now be described.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$V=(Y+R)/(Y-K) \qquad \text{eqn.1}$$

where V is the visual security level (VSL), Y is the luminance of the white state of the display at a snooper viewing angle, K is the luminance of the black state of the display at the snooper viewing angle and R is the luminance of reflected light from the display.

Panel contrast ratio is given as:

$$C=Y/K \qquad \text{eqn. 2}$$

so the visual security level may be further given as:

$$V=(P.L+I.\rho/\pi)/(P.(L-L/C)) \qquad \text{eqn. 3}$$

where off-axis relative luminance, P is typically defined as the percentage of head-on luminance, L at the snooper angle and the display may have image contrast ratio C and the surface reflectivity is $\rho$.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles. allowing the visual security level to be approximated to:

$$V=1+I.\rho/(\pi.P.L) \qquad \text{eqn. 4}$$

In the present embodiments, in addition to the exemplary definition of eqn. 4, other measurements of Visual Security Level, V may be provided, for example to include the effect on image visibility to a snooper of snooper location, image contrast, image colour and white point and subtended image feature size. Thus the Visual Security Level may be a measure of the degree of privacy of the display but may not be restricted to the parameter V.

In comparison to privacy displays, desirably wide angle displays are easily observed in standard ambient illuminance conditions. One measure of image visibility is given by the contrast sensitivity such as the Michelson contrast which is given by:

$$M=(I_{max}-I_{min})/(I_{max}+I_{min}) \qquad \text{eqn. 5}$$

and so:

$$M=((Y+R)-(K+R))/((Y+R)+(K+R))=(Y-K)/(Y+K+2.R) \qquad \text{eqn. 6}$$

Thus the visual security level (VSL), V is equivalent (but not identical to) 1/M. In the present discussion, for a given off-axis relative luminance, P the wide angle image visibility, W is approximated as $$W=1/V=1/(1+I.\rho/(\pi.P.L)) \qquad \text{eqn. 7}$$

It would be desirable to provide control of a switchable privacy display that is determined by user environment and operating function.

FIG. 1 is a schematic diagram illustrating a front view of a privacy display apparatus 100 comprising a privacy control system 500 operating in privacy mode with a first visual security level.

It may be desirable for the display apparatus 100 to enter privacy mode automatically so that managers may reliably enforce the implementation of a corporate policy 240. The control system 500 is capable of selectively operating the display apparatus 100 in the public mode or the privacy mode.

Display system 200 may comprise privacy mode capable display apparatus 100 and control system 500. The display apparatus comprises a display apparatus 100 arranged to display an image and capable of operating in at least a public mode and a privacy mode, wherein the visibility of the image to an off-axis viewer is reduced in the privacy mode compared to the public mode and the visibility of the image to the primary user in an on-axis position remains visible in both the privacy and public modes. Examples of suitable types of display device are described further below.

Means to determine privacy mode operation will now be described.

For a head-on user in typical ambient illuminance environments, desirably the display apparatus 100 provides a displayed image 101 that has a luminance to achieve high image visibility, W in both privacy and public modes of operation.

The display system 200 may also comprise inputs related to desirable circumstances to provide privacy images, or conversely by undesirable circumstances to provide public images. Such desirable and undesirable circumstances may be determined by policy 240 that is provided for example by a corporate policy, government policy, medical ethical policy or by user preference settings.

Time signal 262 may be provided to correlate with expected working or usage patterns. For example, at night time, privacy mode may be automatically enabled to achieve reduced stray light to other users. Further privacy operation can be coordinated with known calendar entries for the user, for example to coincide with known travel arrangements.

Network ID 201 may be provided to wireless network 202 by means of communication 204. The network ID 201 and wireless network 202 may be determined to be an external network and privacy mode enabled. The display apparatus 100 is arranged to connect to a network and the network name or identity ID 201 can be used by the control system 500 to recognise the location of the display apparatus 100. For example if a known network with the attribute of "home" or "office" is detected, the display apparatus may be controlled to enable the public display mode. Conversely unknown network connections or no network connection may be recognised as inferring that the privacy display mode should be activated automatically.

If a private network such as a cell phone connection is in use and the user is not in a private location privacy mode may be enabled for example. Further, if the display is operated in "airplane mode" privacy operation may be automatically enabled.

Location 206 may be determined by measurement 260 from GPS 258. Some locations may be defined as requiring privacy mode operation. The location may further be detected from data on the geographical location of the cell phone base station tower provided by the network ID 201 that the mobile data connection to the device is using. The variation in the position of the GPS sensor 206 signal with time may be used by the control system 500 to determine that the device is moving beyond a certain speed and therefore to infer that the display apparatus 100 is for example on a train and that the display apparatus 100 should be controlled to enter privacy mode. Similarly, GPS sensor 206 may be used to determine the altitude of the device and thereby to infer that the device is on an airplane and that the display apparatus 100 should automatically switch to privacy mode. When GPS sensor 206 is unavailable and when the device is connected to a corporate network with Network ID 201 via a mobile data connection e.g. 3G, 4G or 5G, the doppler effect on the radio signals may be used to determine the speed of movement and thereby to infer that the device is in motion such as on a train and therefore switch automatically to privacy mode.

The control system 500 may be arranged to selectively operate the display apparatus 100 in the public mode or the privacy mode in response to the detected level of the ambient light. The ambient light level may be detected by an Ambient Light Sensor 232 such as a photodiode which may have a photopic filter or a photopic light response current or voltage or digital value.

Some types of display have multiple optical effects to improve privacy performance, with exemplary optical effects described below. If more than one privacy optical effect is available, the mode that gives the widest viewing freedom for the primary user while still maintaining adequate Visual Security Level at the ambient light level experienced can be selected by the control system 500. Advantageously privacy is protected, and user productivity is maintained.

Visible applications 274 may be analysed to determine whether content of images 101 is suitable for public display. If private application 276 is visible on the display, then privacy mode operation is provided.

Visible applications 276 may also be provided with text 224 and images that have feature sizes (such as font sizes) that have controlled modulation transfer functions when the applications are operated in privacy mode. For example in privacy mode of operation text size may be reduced.

Camera 230 and user identification system (not shown) may be used to determine that the user is not permitted to operate the display in public mode. Thus the control system may selectively operate the display device in the public mode or the privacy mode in response to the received identity of the user.

The display apparatus 100 may be arranged to receive the identity of the user, for example by means of face detection from images provided by the camera 230. Other known means of identifying the user including but not limited to fingerprint or retina scan may also be used. External command 243 may be provided by a remote user to lock the display to privacy mode, for example to control privacy to defined groups of display users.

Airplane mode 270 may be selected, indicating that the device is in a public space and privacy operation may be required by the policy 240. Further, airplane viewing conditions at night time may be a specifically demanding snooping environment, and so the control system 500 may trigger additional privacy enhancement including contrast reduction, white point shift and spatial frequency changes as will be described further below.

Local command to over-ride public display operation may be provided by user override 46 by means of key 47 press for example. It may be desirable for the user to override the default privacy settings under conditions allowed by policy 240. The control system 500 selectively operates the display apparatus 100 in the public mode or the privacy mode in response to the received user override 46. The user may determine that whilst in flight or in a train his specific location is not vulnerable to being overlooked and so it may be preferable to operate the display apparatus 100 in public mode. Advantageously in public mode the display apparatus 100 may have greater image uniformity and viewing freedom for the primary user as well as being visible from multiple viewing locations.

Visual security level indicator 280 may be provided on the display which is a measure of the privacy level achieved. In the illustrative example of FIG. 1, the indicator 282 may be an amber privacy warning that indicates there may be some residual image visibility to an off-axis snooper. When switched in to privacy mode the control system 500 may be arranged to control the display apparatus 100 to display image 101 with information such as indicator 280 representing the visibility of the image to an off-axis viewer, for example to provide Visual Security Level, V. Advantageously the user or their supervisor may be confident in the privacy level being achieved in the specific environment in which they are operating.

The display appearance in privacy mode as seen by a snooper will now be described together with further inputs for the control of visual security level.

Figure 2:
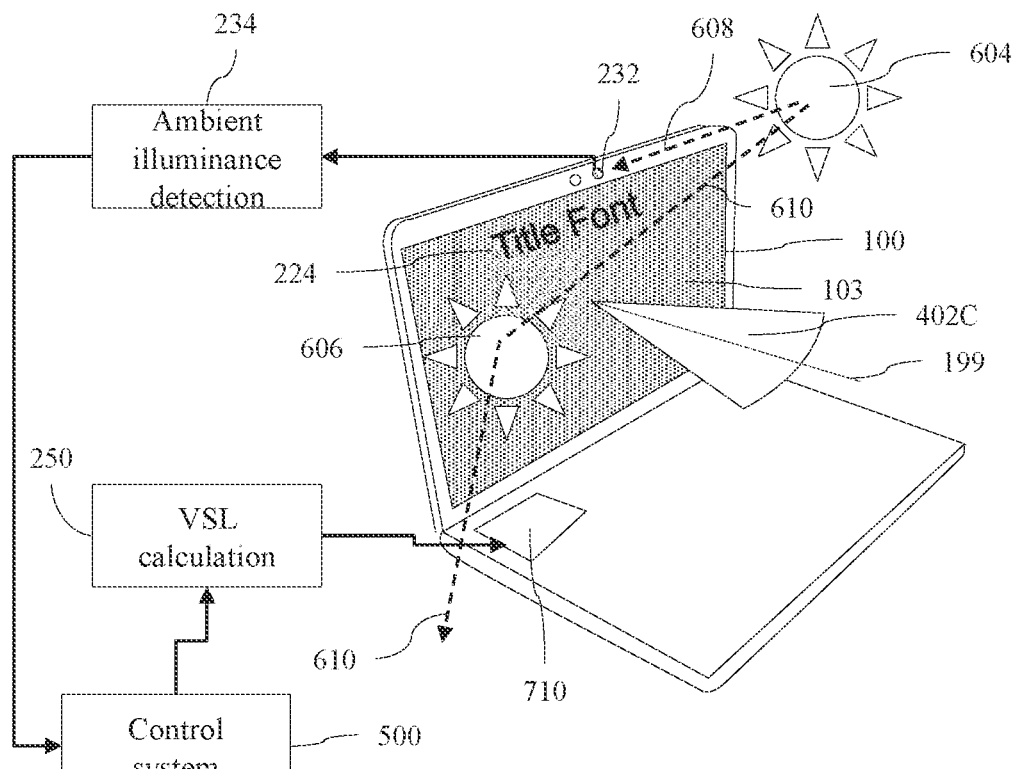
FIG. 2 is a schematic diagram illustrating a look-down perspective of a privacy display comprising a privacy control system operating in privacy mode with a first visual security level.

FIG. 2 is a schematic diagram illustrating a look-down perspective of a privacy display comprising a privacy control system 500 operating in privacy mode with a first visual security level.

As will be described below, off-axis privacy may be provided by control of off-axis luminance, reflectivity and image contrast of the image 103 provided by a switchable privacy display apparatus 100 to an undesirable snooper.

In operation in privacy mode, a limited output cone angle 402C that is typically centred on the optical axis 199 that is a typically a surface normal to the display apparatus 100 is provided. Off-axis luminance is reduced. Ambient light sources 604 illuminate the display surface with light rays 610. Reflected light 606 from the display provides increased visual security level, V as described above.

Some light rays 608 may be incident on Ambient Light Sensor, ALS 232. The ALS 232 may be a separate element or may be incorporated in the camera 230 detection system.

Ambient illuminance detection 234 provides a calculation of ambient illuminance and is input into the control system 500. VSL calculation 250 is used to determine desirable display setting characteristics and output to display control 710. The display control 710 may control display luminance setting 278 and may be further used to provide visual security level indicator 280 level 282. Display control 710 is further described below in relation to an example of a privacy display.

Features of the embodiment of FIG. 2 not discussed in further detail may be assumed to correspond to the features with equivalent reference numerals as discussed above, including any potential variations in the features.

Advantageously a corporate privacy policy may be enforced when the display apparatus 100 is displaying data and is not in the office or at home. In this display apparatus the security of data on the display apparatus 100 is not reliant on the user fitting a louver screen or on the user pressing a privacy button or key. Advantageously corporate privacy policy may be reliably enforced without dependence on the diligence of the user.

It would be desirable to provide high image visibility to multiple display users in protected environments such as office environments or the home.

Figure 3:
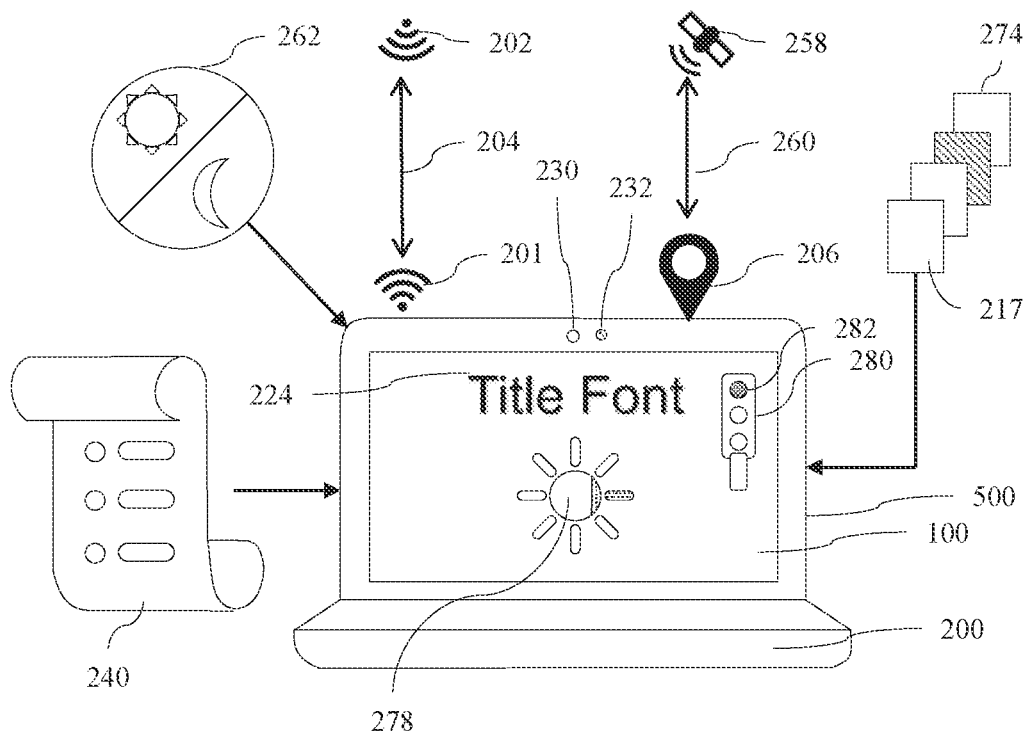
FIG. 3 is a schematic diagram illustrating a front view of a privacy display comprising a privacy control system operating in public mode.
Figure 4:
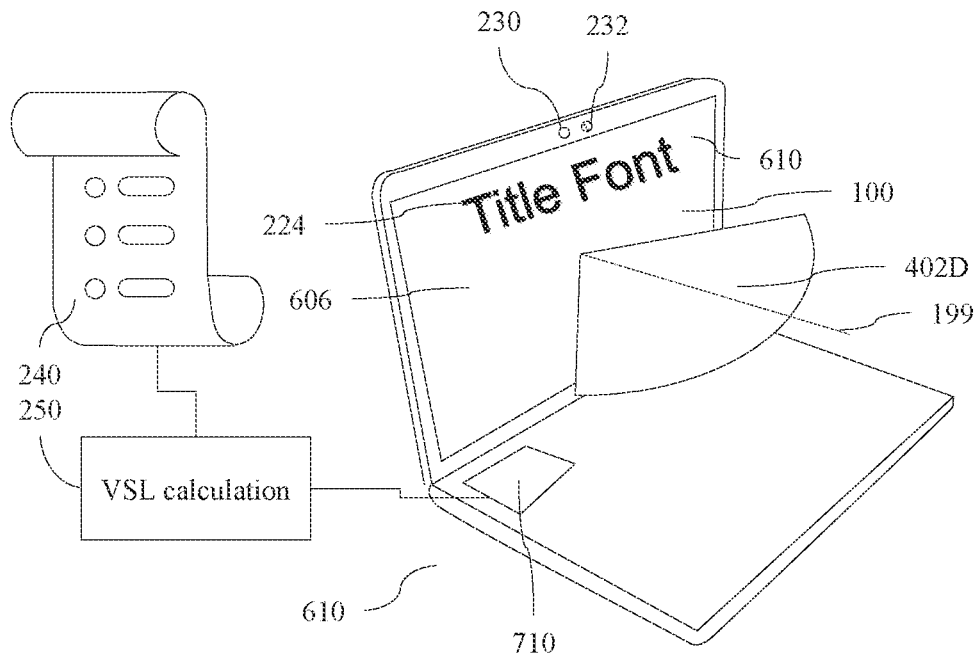
FIG. 4 is a schematic diagram illustrating a look-down perspective of a privacy display comprising a privacy control system in public mode.

FIG. 3 is a schematic diagram illustrating a front view of a privacy display comprising a privacy control system operating in public mode; and FIG. 4 is a schematic diagram illustrating a look-down perspective of a privacy display comprising a privacy control system in public mode.

In comparison to FIG. 1, conditions that individually or in combination provide allowable public display use will now be described. In public display mode, the output light cone 402D from the switchable privacy display apparatus 100 may be adjusted to be larger than in privacy mode, such that off-axis display luminance is increased.

Time signal 262 may be provided to correlate with expected working or usage patterns, for example, in usual working hours.

The wireless ID 201 and wireless network 202 may be determined to be an internal network.

Certain office locations or other allowed spatial locations for the display system 200 may be permitted.

Visible applications 274 may be analysed to determine whether content is suitable for public display.

All applications 274 may also be provided with desirable text 224 size and image properties with high image contrast.

Camera 230 and user identification system (not shown) may be used to determine that all visible users are permitted.

Visual security level indicator 280 may be provided on the display which is a measure of the privacy level achieved. In the illustrative example of FIG. 3, the indicator 282 may be a red privacy warning that indicates there is high image visibility to an off-axis snooper.

Control of a switchable privacy display will now be further described.

Features of the embodiment of FIG. 3 and FIG. 4 not discussed in further detail may be assumed to correspond to the features with equivalent reference numerals as discussed above, including any potential variations in the features.

Figure 5A:
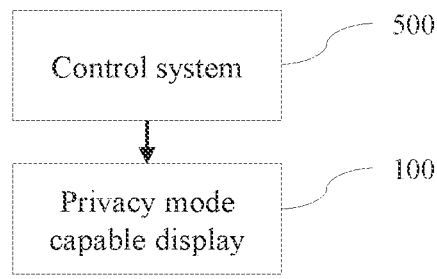
FIG. 5A illustrates a flowchart for a privacy display comprising a privacy control system.

FIG. 5A illustrates a flowchart for a privacy display comprising a privacy control system. Thus a control system 500 is arranged to control the display apparatus 100.

Figure 5B:
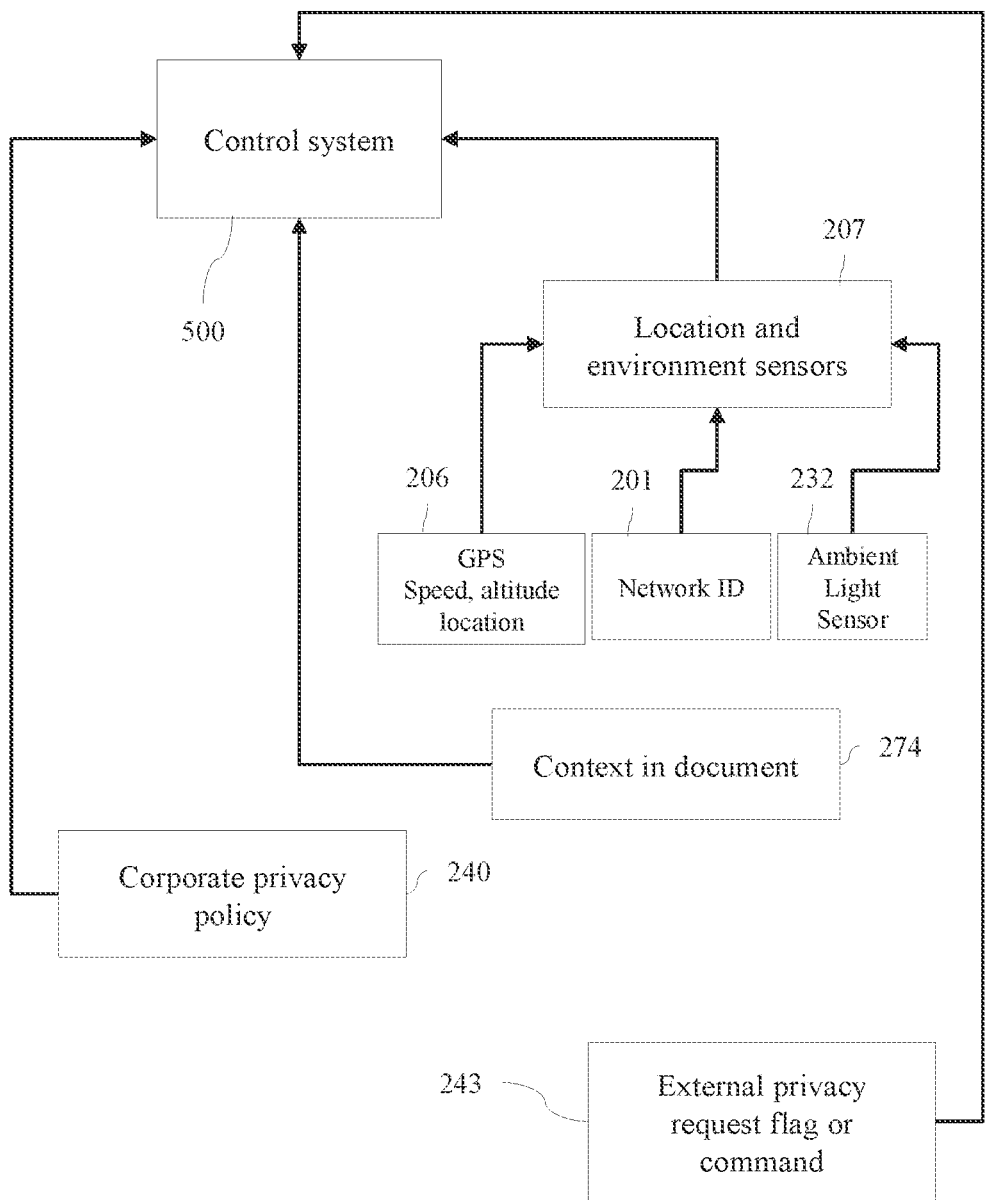
FIG. 5B illustrates a flowchart of the privacy control system of FIGS. 1-2.

FIG. 5B illustrates a flowchart of the privacy control system 500 that selectively operates the display apparatus 100 in the public mode or the privacy mode in response to the nature of the network to which it is connected or the output of sensors or corporate privacy policy 240. Thus FIG. 5B illustrates further the control system 500 that selectively operates the display apparatus 100 in the public mode or the privacy mode in response to the detected location.

Features of the embodiment of FIG. 5A and FIG. 5B not discussed in further detail may be assumed to correspond to the features with equivalent reference numerals as discussed above, including any potential variations in the features.

Switching between exemplary privacy and public luminance profiles will now be described.

Figure 6A:
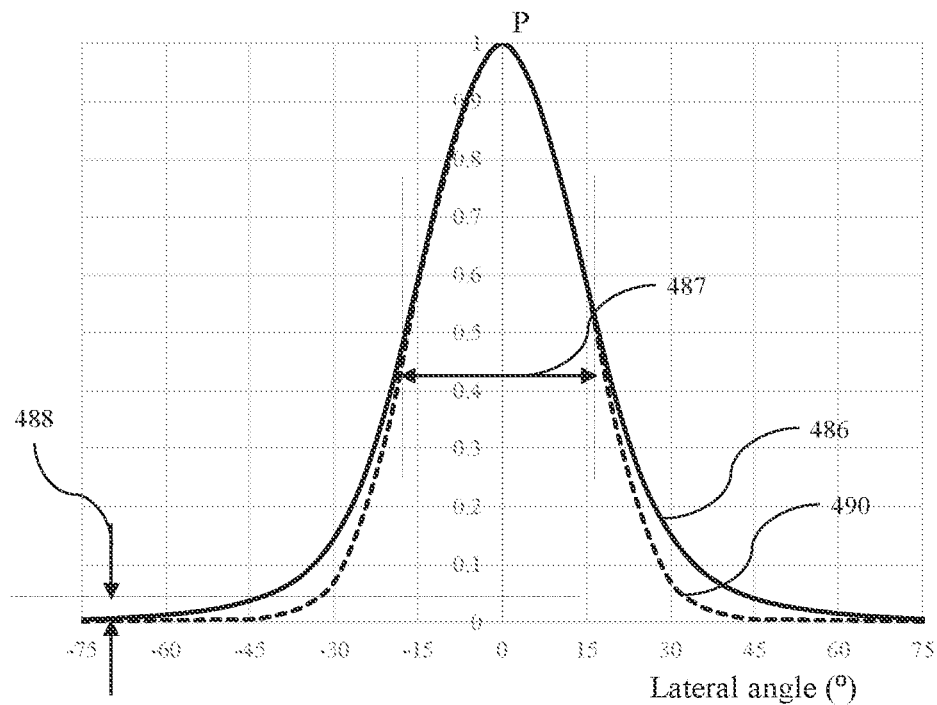
FIG. 6A is a schematic graph illustrating variation of output luminance with viewing angle for a typical collimated backlight arranged to cooperate with a switchable retarder to provide high visual security level to a wide range of snooper locations.

FIG. 6A is a schematic graph illustrating variation of output luminance with viewing angle for a typical collimated backlight arranged to cooperate with plural retarders 300 to provide high visual security level from a wide range of snooper locations. Features of the embodiment of FIG. 6A not discussed in further detail may be assumed to correspond to the features with equivalent reference numerals as discussed above, including any potential variations in the features.

Figure 15:
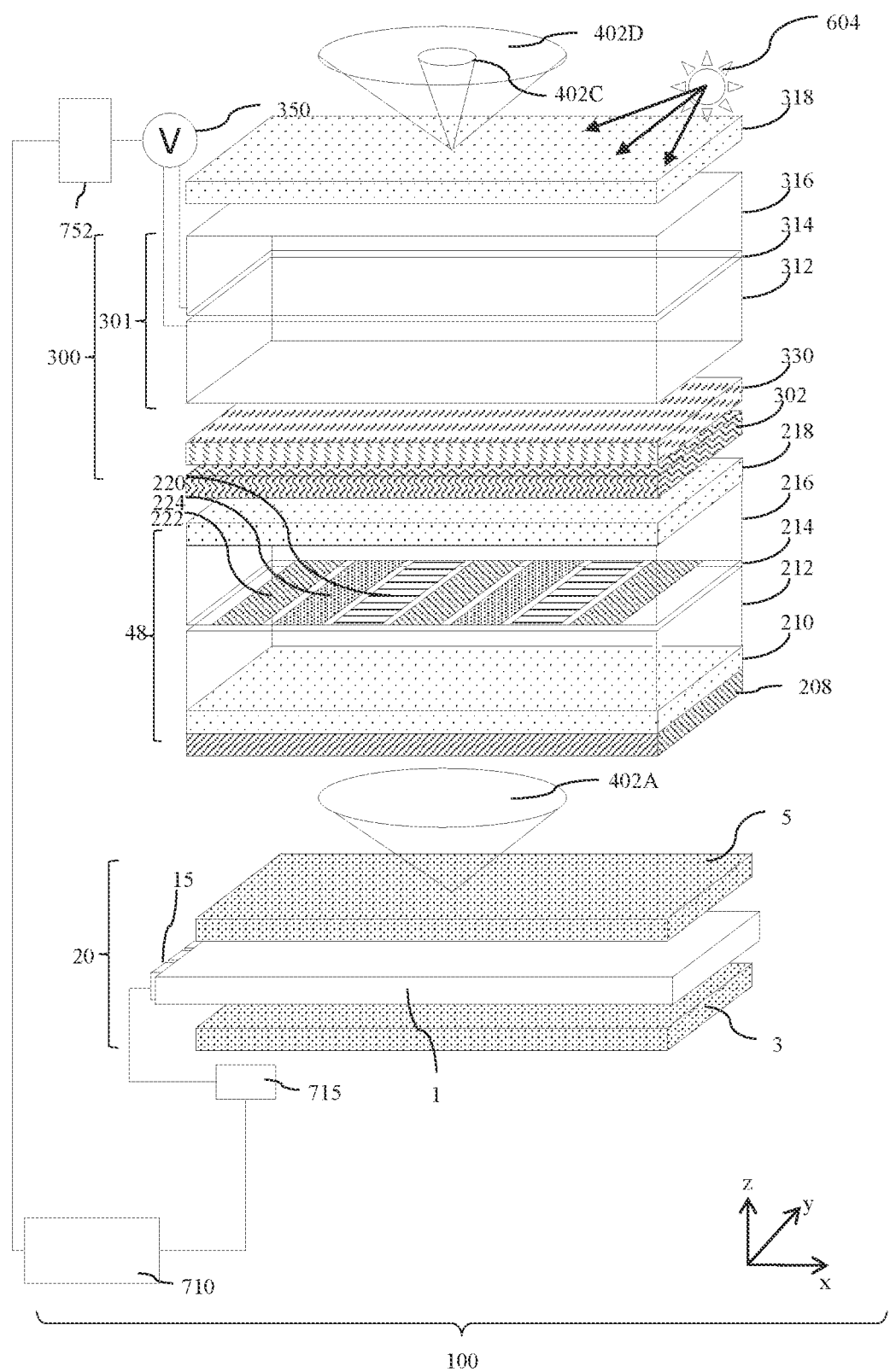
FIG. 15 is a schematic diagram illustrating in front perspective view a switchable directional display apparatus comprising a switchable directional backlight and a switchable liquid crystal retarder.

FIG. 6A illustrates a desirable luminance profile 486 of a backlight 20 operated in privacy mode for use with the switchable liquid crystal retarder 300 of FIG. 15 in privacy mode. The profile 486 is modified by switchable liquid crystal retarder 300 to provide an illustrative profile 490 that advantageously achieves an off-axis relative luminance of less than 0.5% at 45 degrees lateral angle and zero degrees elevation, that may be the target snooper viewing polar locations 27L, 27R illustrated in FIG. 16C for example.

Control of Visual Security Level will now be further described.

Figure 6B:
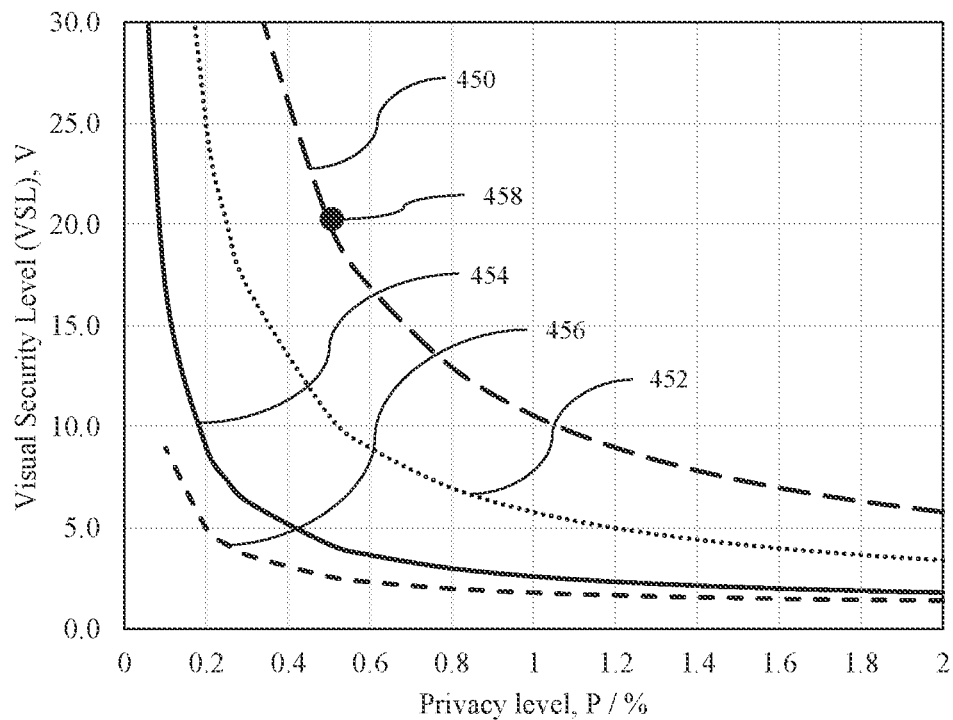
FIG. 6B is a schematic graph illustrating variation of Visual Security Level with off-axis relative luminance of a switchable privacy display operating in privacy mode.

FIG. 6B is a schematic graph illustrating variation of Visual Security Level with off-axis relative luminance of a switchable privacy display operating in privacy mode and with reference to the privacy display of FIG. 15 and with reference to FIGS. 16A-16E and FIGS. 17A-17E, as exemplary embodiments of a switchable privacy display 100. Features of the embodiment of FIG. 6B not discussed in further detail may be assumed to correspond to the features with equivalent reference numerals as discussed above, including any potential variations in the features.

FIG. 6B illustrates the profiles for visual security level, V (calculated in each illustrative embodiment from eqn. 4, above) and with the illustrative embodiments as illustrated in TABLE 1 for varying privacy levels achieved at the target snooper viewing locations 26L, 26R. Display reflectivity of 30% or more may be achieved for displays comprising reflective polariser 302, while display reflectivity of approximately 5% may be achieved for displays not comprising reflective polariser 302.

TABLE 1

| Profile | Display reflectivity, $\rho$ (%) | Ambient illuminance, I (lux) | Head-on luminance, L (nits) | Visual Security Level, V @ 45° lateral angle, 458 |
|---|---|---|---|---|
| — | 30 | 500 | 200 | 48.7 |
| — | 30 | 500 | 300 | 32.8 |
| 450 | 30 | 300 | 300 | 20.1 |
| 452 | 30 | 150 | 300 | 10.5 |
| — | 5 | 500 | 100 | 16.9 |
| — | 5 | 500 | 200 | 9.0 |
| 454 | 5 | 300 | 300 | 4.2 |
| 456 | 5 | 150 | 300 | 2.6 |

At 0.5% privacy level, various Visual Security Level points 458 may be provided depending on display structure, ambient illuminance and display luminance. The present embodiments further provide indicator 280 for display of Visual Security Level that may be provided for example by means of traffic light indicators.

The variation of display reflectivity with viewing angle will now be described.

Figure 6C:
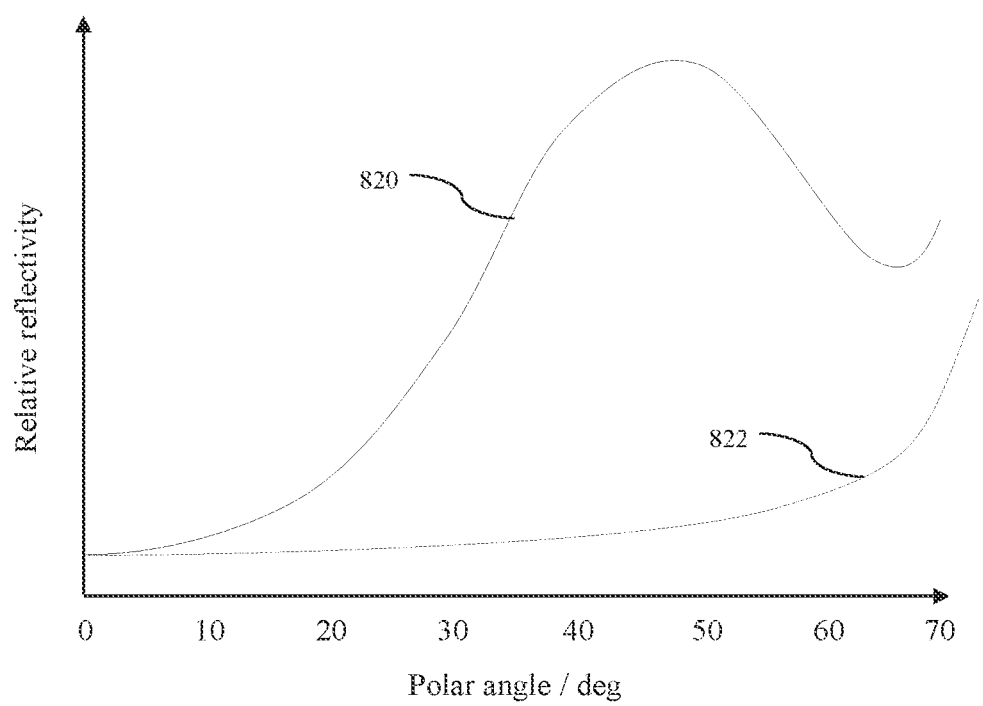
FIG. 6C is a schematic graph illustrating variation of reflectivity with polar viewing angle for two types of privacy display.

FIG. 6C is a schematic graph illustrating variation of reflectivity with polar viewing angle for two types of privacy display. Profile 820 illustrates the variation of reflectivity for an illustrative embodiment of FIGS. 16D-E and profile 822 illustrates the variation of reflectivity for an embodiment without the reflective polariser 302 of FIG. 15 and FIG. 16A. Both profiles include Fresnel reflectivity at the outer polariser 318 and thus increase at high polar angles.

The variation of visual security level, V with viewing angle will now be described.

Figure 6D:
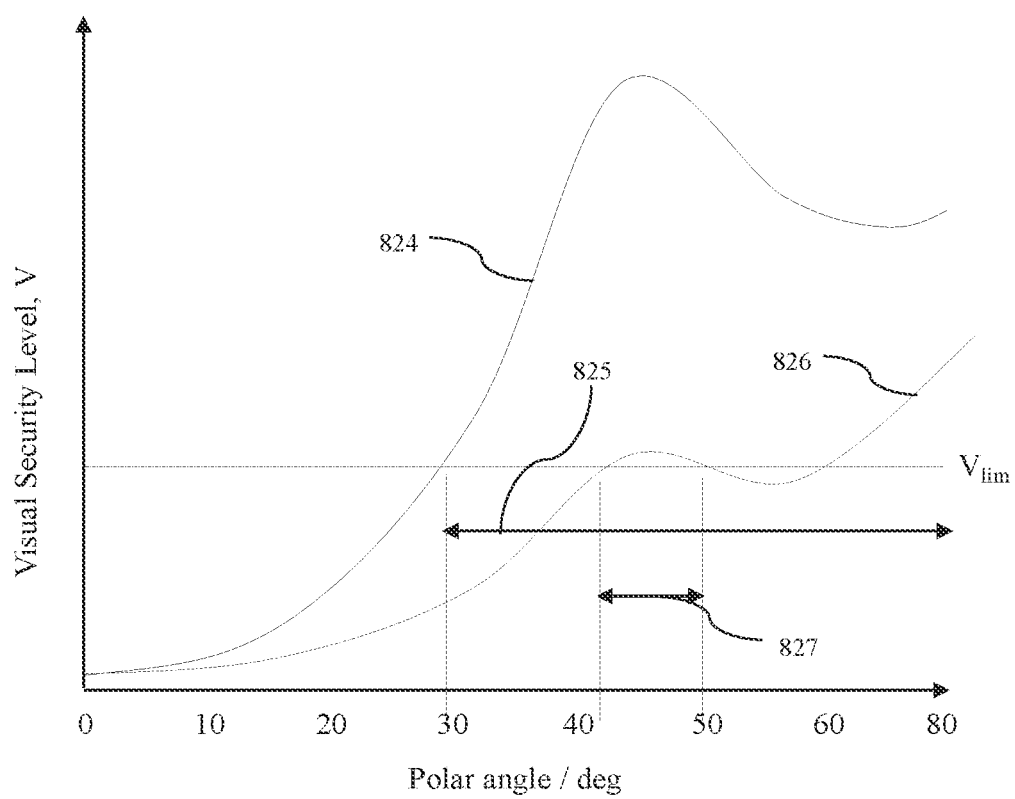
FIG. 6D is a schematic graph illustrating variation of Visual Security Level with polar viewing angle for the two types of privacy display of FIG. 6C.

FIG. 6D is a schematic graph illustrating variation of visual Security Level with polar viewing angle for the two types of privacy display of FIG. 6C. VSL profile 824 illustrates an output for a display of the type of FIG. 15 with reflective polariser 302, and VSL profile 826 illustrates an output for the display of FIG. 15 with the reflective polariser 302 omitted. VSL profiles are illustrated for the same ambient illuminance, I. The limit $V_{lim}$ above which no image visibility is present is described further below. The angular range 825 of snooper locations for the profile 824 is thus greater than the angular range 827 for the profile 826. The reflective polariser 302 achieves above threshold visual security level over a wider polar range, advantageously achieving increased protection from snoopers. Further, head-on luminance may be increased for a given ambient illuminance, increasing image visibility for the display user.

Selective control of the relationship between desirable display luminance and ambient light illuminance will now be described.

Figure 7A:
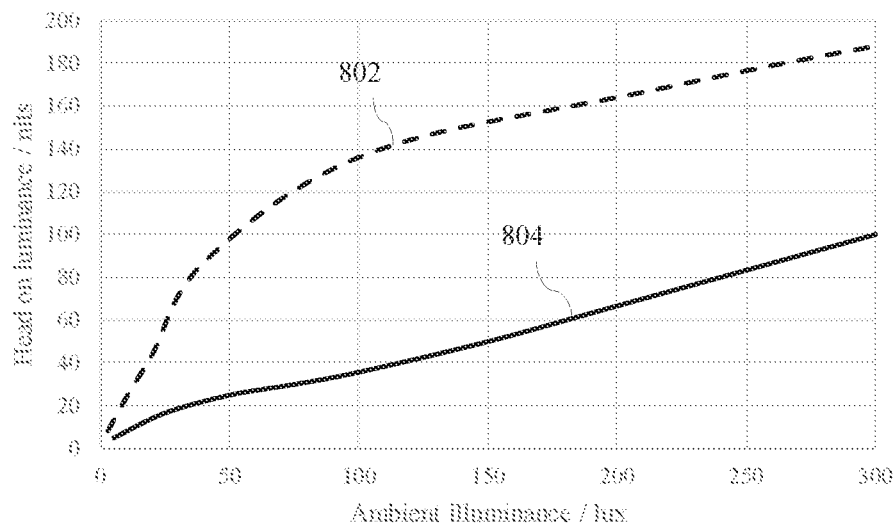
FIG. 7A is a schematic graph illustrating transfer functions between head-on display luminance and ambient illuminance.
Figure 7B:
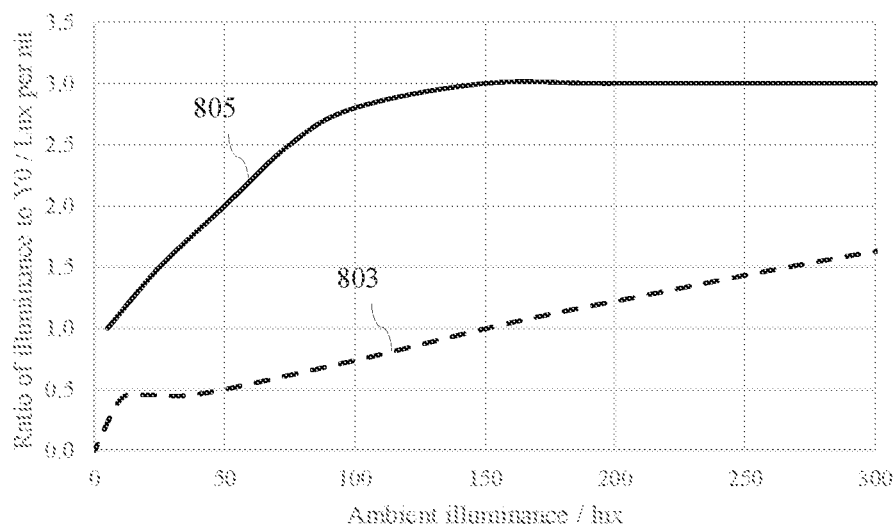
FIG. 7B is a schematic graph illustrating transfer functions between the ratio of measured ambient illuminance to head-on display luminance and ambient illuminance.

FIG. 7A is a schematic diagram illustrating exemplary transfer functions 802, 804 between display head-on luminance and detected ambient illuminance; and FIG. 7B is a schematic graph illustrating transfer functions between the ratio of measured ambient illuminance to head-on display luminance and ambient illuminance.

Variations 802, 803 are illustrative profiles for public mode of operation and variations 804, 805 are illustrative profiles for privacy mode of operation.

The control system 500 is arranged to selectively control luminance of the displayed image in the public mode and the privacy mode in response to the detected level of the ambient light, in accordance with different transfer functions 802, 804 relating levels of luminance to detected levels of the ambient light in the public mode and in the privacy mode respectively. The transfer function 802 in the public mode relates higher levels of luminance to detected levels of the ambient light than the transfer function 804 in the privacy mode.

When operating in the privacy mode the privacy transfer function 804 is selected and the control system uses the measured ambient light level to control the display luminance so that a desirable Visual Security Level, V at at-least one off-axis snooper observation angle is provided for different ambient illumination levels. Advantageously display security may be maintained in different or varying lighting conditions.

When operating in the public mode the public transfer function 802 may be selected to provide a desirable image visibility, W for different ambient illumination levels. Advantageously display visibility may be maintained in different lighting conditions for off-axis observers.

Desirable limits for head-on luminance of the display operating in privacy mode will now be described.

Figure 7C:
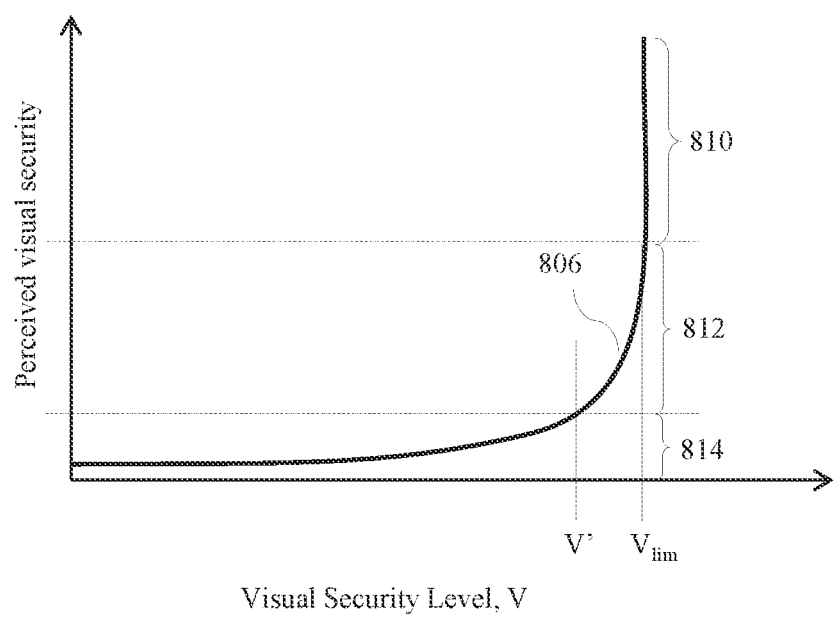
FIG. 7C is a schematic graph illustrating the variation of perceived privacy with visual security level.

FIG. 7C is a schematic graph illustrating the variation 806 of perceived visual security with visual security level, V at an observation angle θ. Visual security level V is a measured quantity of any given display and varies with polar viewing angle.

By comparison with visual security level V, perceived visual security is a subjective judgement of the visibility of a displayed privacy image arising from the human visual system response at the observation angle.

In operation it has been discovered that above a threshold limit $V_{lim}$ of visual security level V then no image information is perceived. This transition in the perceived visibility with changes in the visual security level V is very rapid, as shown by the steepness of the graph in FIG. 8 around the threshold limit $V_{lim}$. That is, as the visual security level V increases, initially the perceived visibility degrades only gradually and the image is essentially viewable. However, on reaching the threshold limit $V_{lim}$, the perceived image rapidly ceases to be visible in a manner that is in practice surprising to watch.

In observation of the surprising result, for a text document image that is of concern for privacy applications it was found that the perceived image seen by a snooper rapidly ceased to be visible for V of 10. In the region 810 for values of V above 10, all the displayed text had zero visibility. In other words the perceived text rapidly ceases to be visible in a manner that is in practice surprising to watch for V of 10 or greater.

In regions 812 below $V_{lim}$ text was visible with low contrast and in region 814 below V' text was clearly visible.

It would be desirable to maximise head-on display luminance to achieve high image visibility to the primary display user. It would be further desirable to achieve high image security level for a snooper at the observation angle. The selective control of the head-on luminance will now be described in further detail.

For an observation angle θ, the maximum display output luminance Y0 (typically the head-on luminance) is prevented from exceeding a luminance limit $Y0_{lim}$ at which the visual security level V is above the threshold limit $V_{lim}$ so that the image is not perceived as visible at that observation angle θ, the luminance limit $Y0_{lim}$ being given by:

$$Y0_{lim} = \frac{R\theta + V_{lim} * K\theta}{(V_{lim} - 1) * P\theta} \qquad \text{eqn. 8}$$

where Rθ is the reflected ambient illuminance at the observation angle θ, Kθ is the display black state luminance at the observation angle, and Pθ is the relative luminance at the observation angle θ compared to the maximum display output luminance Y0 (typically the head-on luminance and is measured in nits). For display reflectivity ρθ and a Lambertian illuminant with illuminance Iθ measured in lux that is reflected by the display at the observation angle, the luminance limit $Y0_{lim}$ is also given by:

$$Y0_{lim} = \frac{\frac{\rho\theta * I\theta}{\pi} + V_{lim} * K\theta}{(V_{lim} - 1) * P\theta} \qquad \text{eqn. 9}$$

Since the illuminance Iθ is dependent on the amount of ambient light, the luminance of the display apparatus may be controlled by the control system 500 in accordance with these relationships. Specifically, the privacy transfer function 804 used by the control system 500 as described above may be selected to maintain the relationship $Y0 \leq Y0_{lim}$ in order that the image is not perceived as visible at a desired observation angle θ, for example at an observation angle θ of 45 degrees laterally and zero degrees in elevation from the normal to the display apparatus.

Subject to that limit, the luminance is preferably as high as possible in order to optimise the performance for the head-on view. Accordingly, the privacy transfer function 804 used by the control system 500 as described above may additionally be selected to maintain the relationship $Y0/I\theta \geq 1$ lux/nit as illustrated by the profile 805 in FIG. 8. The illuminance Iθ may be the sensed ambient illuminance that is averaged from the illuminated scene.

Advantageously a display may be provided that has high image security to off-axis snoopers while achieving high image visibility for the head-on user for different illuminance levels may be provided.

Figure 8A:
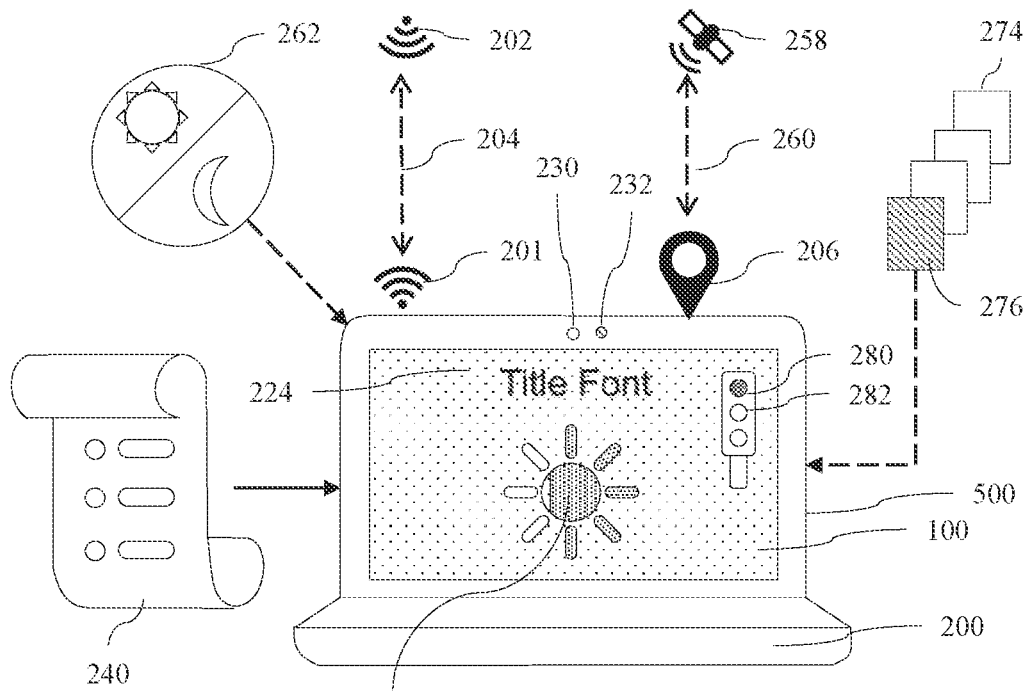
FIG. 8A is a schematic diagram illustrating a front view of a privacy display comprising a privacy control system operating in privacy mode with a second visual security level.
Figure 8B:
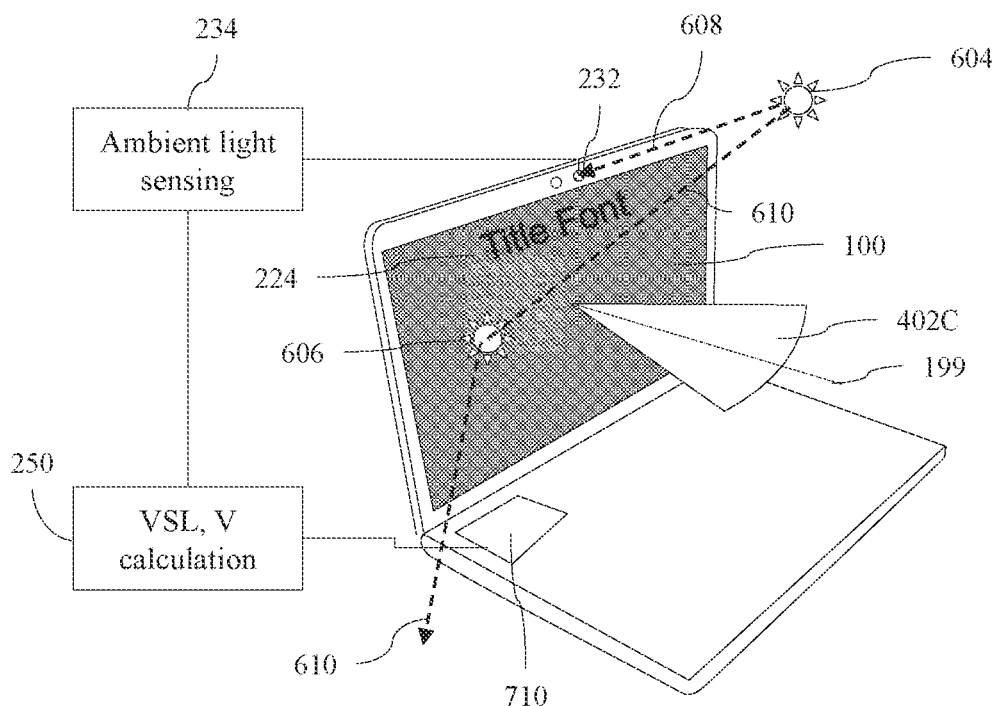
FIG. 8B is a schematic diagram illustrating a look-down perspective of a privacy display comprising a privacy control system operating in privacy mode with a second visual security level.

FIG. 8A is a schematic diagram illustrating a front view of a privacy display comprising a privacy control system operating in privacy mode with a second visual security level; and FIG. 8B is a schematic diagram illustrating a look-down perspective of a privacy display comprising a privacy control system operating in privacy mode with a second visual security level.

In operation, ambient light sensor 232 may provide a measurement of ambient illuminance. In comparison to FIGS. 1-2, the illuminance of light rays 608 may be lower, and thus the ratio I/L reduces, reducing Visual Security Level for a given head-on luminance. The control system 500 may be arranged to perform calculation of Visual Security Level, and reduce display luminance, L to increase VSL to desirable levels by means of display control 710. Thus the luminance 278 seen by the head-on user reduces. Such an improvement may be highlighted by a change in the indicator 280 from red to green or amber, depending on desirable levels of Visual Security Level.

The desirable levels of Visual Security Level for display operation may be set by policy 240, and said policy may vary said desirable levels of Visual Security Level related to the nature of the viewing environment. For example, in high risk environments, the allowable head-on luminance 278 may be lower than in low risk environments. At threshold environments, for example in very low levels of ambient illumination 604 illuminance, I then viewing of certain content may be prohibited.

Features of the embodiment of FIG. 8A and FIG. 8B not discussed in further detail may be assumed to correspond to the features with equivalent reference numerals as discussed above, including any potential variations in the features.

Figure 9:
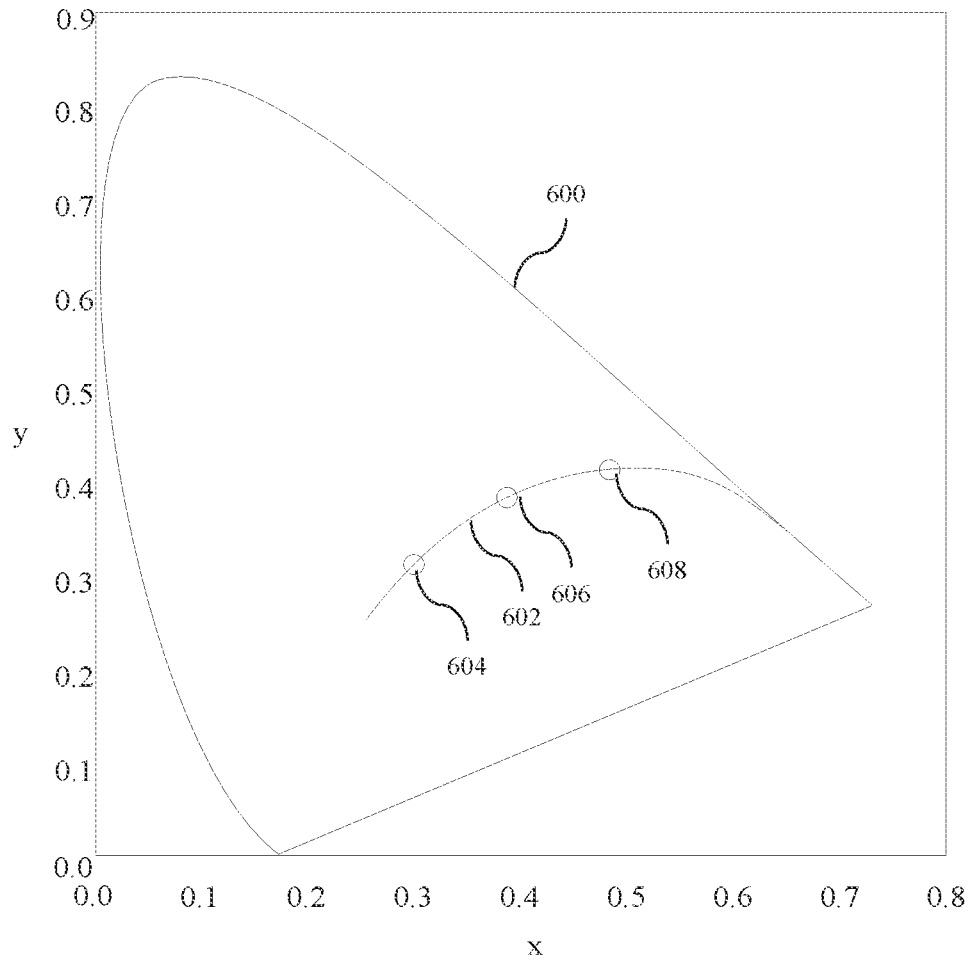
FIG. 9 is a schematic graph of CIE 1931 x-y coordinates illustrating variation in image white point with Visual Security Level.

FIG. 9 is a schematic graph of CIE 1931 x-y coordinates illustrating variation in image white point with Visual Security Level.

In operation, the white point of the display may be adjusted along an illustrative locus 602 in dependence on the calculated Visual Security Level.

Thus the display when operating in privacy mode may be arranged with white point 605 when the calculated VSL is high, and the white point may be adjusted to locations 606, 608 in dependence on the calculated VSL. Thus the display may appear more yellow as the VSL reduces.

Advantageously the image contrast of black on yellow images is lower than for white on black images, thus reducing image visibility to the off-axis snooper.

A colour adjusted VSL parameter may further be defined based on the white point selected, so that the indicator 280 may be adjusted accordingly.

Colour adjustment may also be automatically made when a device is adjusted to airplane mode and is operating with privacy images for example.

Features of the embodiment of FIG. 9 not discussed in further detail may be assumed to correspond to the features with equivalent reference numerals as discussed above, including any potential variations in the features.

Further description of the control of a privacy display will now be described.

Figure 10:
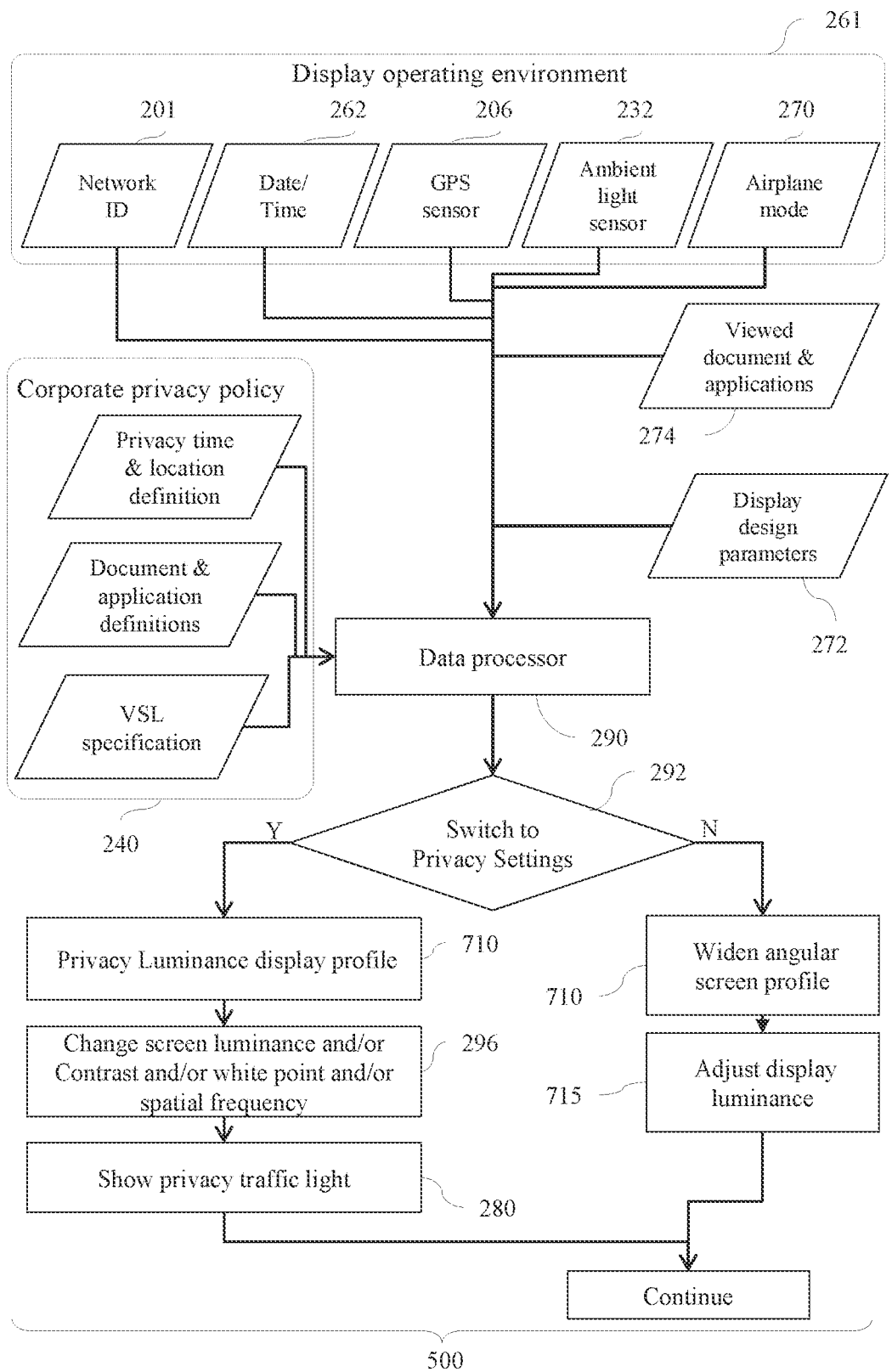
FIG. 10 illustrates a flowchart of the privacy control system of FIGS. 1-2 and FIGS. 3-4.

FIG. 10 illustrates a flowchart of the privacy control system of FIGS. 1-2 and FIGS. 3-4.

The display operating environment 261 may include (but is not limited to) network ID 201, Date/Time 262, GPS 206 data, Ambient Light Sensor 232 detection and Airplane mode 270 setting.

Corporate privacy policy 240 may include definitions under which the display should be operated in privacy mode including time and location; documents and applications, and Visual Security Level specifications.

Other inputs may include display design parameters 272 and information on viewed documents and applications 274.

Data processor 290 is used to analyse display operating environment 261, display design parameters 272, viewed documents and applications 274 and compare against corporate privacy policy 240. The output determines whether to operate the display in privacy or public mode such that switch 292 is set for privacy or public mode operation based on data processor 290 output.

In the case of privacy mode operation the settings to apply to the display apparatus 100 using display control system 710 and images 101 using image control system 296 in order to achieve desirable Visual Security Level are provided. Further indication of Visual Security Level using indicator 280 may be provided.

In the case of public mode operation, the appropriate illumination control including cone angle change by display control system 710 and luminance using LED driver 715 are provided to the display apparatus 100.

The controller 500 may continue to monitor the status of the display operating environment 261 and appropriate changes in policy 240 and adjust display apparatus 100 and images 101 appropriately to maintain the target Visual Security Level.

Advantageously the control system 500 may enable the Visual Security Level, that may be the Visual Security Level to be reliably calculated and compared to a corporate policy 240 level set for the device's current environment. The Visual Security Level may be adjusted to the level required for the display apparatus 100 environment so that the primary user retains optimal viewing freedom and comfort consistent with achieving the prescribed corporate privacy policy privacy level.

Features of the embodiment of FIG. 10 not discussed in further detail may be assumed to correspond to the features with equivalent reference numerals as discussed above, including any potential variations in the features.

The control of a privacy display in response to a measured Visual Security Level will now be described.

Figure 11A:
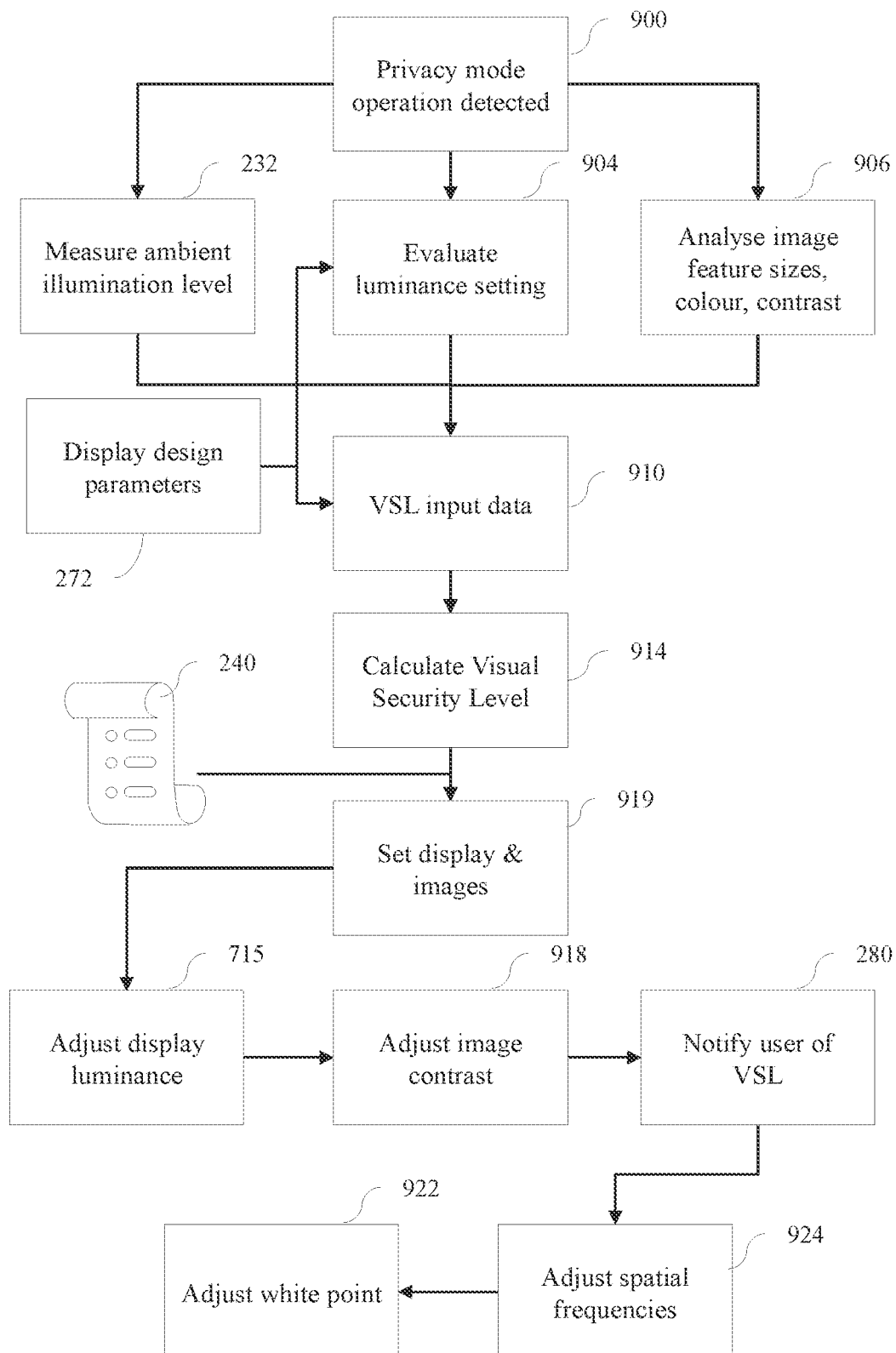
FIG. 11A illustrates a flowchart for control of a privacy display by means of calculation of Visual Security Level.

FIG. 11A illustrates a flowchart for control of a privacy display by means of calculation of Visual Security Level.

The display apparatus 100 may be provided wherein the control system 500 is arranged to selectively control any one or more of luminance of the display 100 or contrast, white point and spatial frequency of the image 101 in the privacy mode in response to the measured level of the ambient light using Ambient Light Sensor 232.

A luminance evaluation system 904 may be provided to determine output luminance to the head-on user and snooper based on measurement of LED current and display apparatus 100 calibrated characteristics for example, that may be provided as display design parameters 272.

An image analysis engine 906 may provide information on images 101 including but not limited to text sizes, image spatial resolution, colour, and contrast.

Such data may be collected by VSL input data unit 910 and Visual Security Level calculated accordingly in VSL calculator 914.

The display apparatus 100 and image 101 may be set automatically by controller 919 to achieve a certain desired or mandated privacy level specified by policy 240.

In one optional step LED driver 715 may be used to adjust display luminance.

In further optional step colour controller 922 may be used to adjust the colour of the image 101 as illustrated in FIG. 9 for example.

In further optional step contrast controller 918 may provide reduced image 101 contrast for example by adjustment of image gamma curve to achieve an improved Visual Security Level.

In further optional step spatial frequency controller 924 may provide image 101 with reduced font sizes, and image blur for large areas of image to reduce visibility of features at snooper viewing distances and achieve an improved Visual Security Level. The spatial frequencies in the image, (in another example by zooming out or reducing the screen magnification), can make the off-axis image more difficult to read as the snooper is typically further from the display apparatus 100 than the primary user.

The control system 500 may display the currently achieved privacy score or level as a number or as a traffic light colour 282 on indicator 280.

It may be desirable to provide some choice to the user for optimum image performance while providing Visual Security Level within policy 240 limits.

Figure 11B:
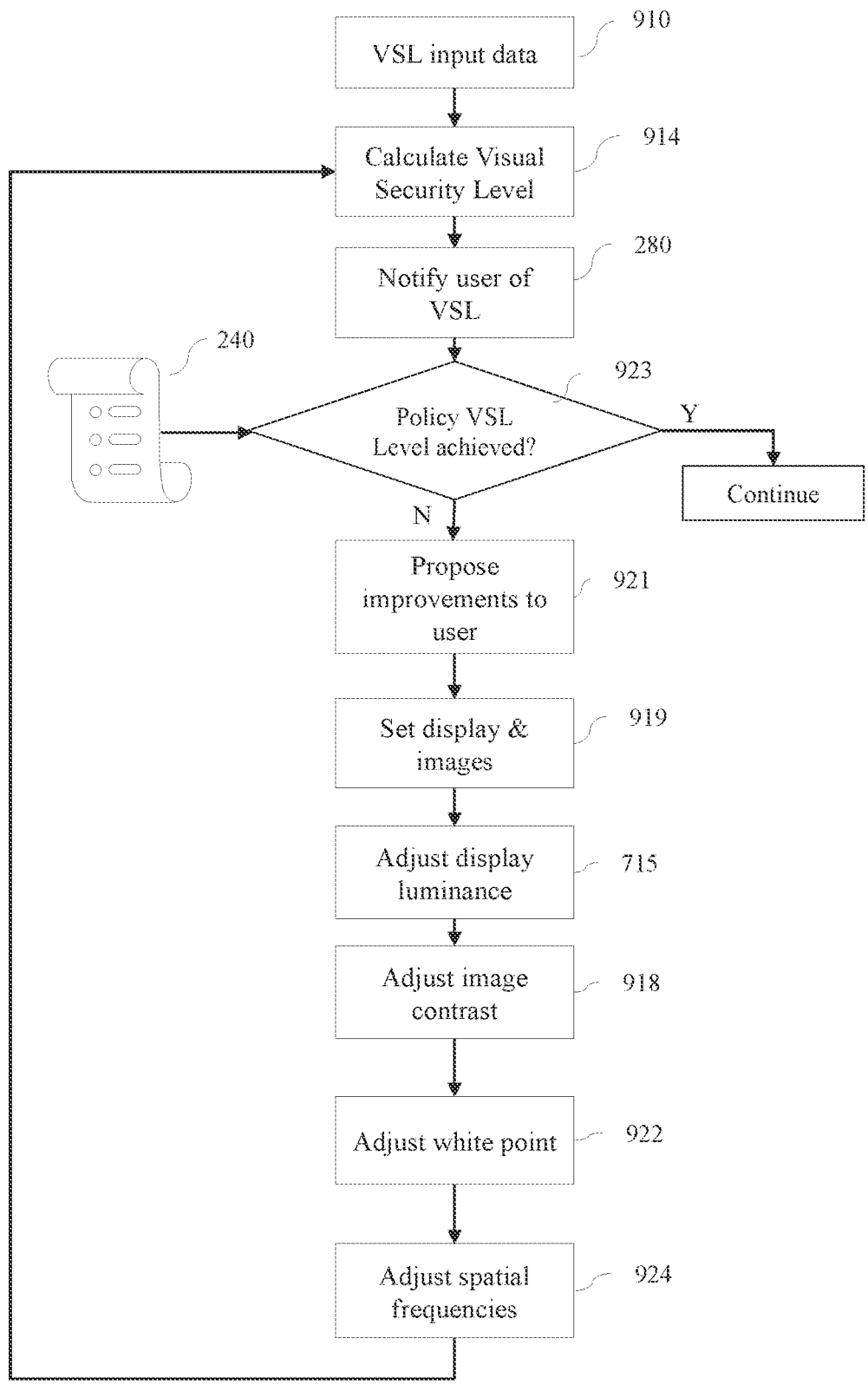
FIG. 11B illustrates a flowchart for control of a privacy display by means of calculation of Visual Security Level and user feedback on preferred improvements.

FIG. 11B illustrates a flowchart for control of a switchable privacy display apparatus 100 by means of calculation of Visual Security Level and user feedback on preferred improvements.

If the display achieves the correct Visual Security Level after notifying the user of the Visual Security Level in indicator 280 switch 923 provides the current settings to the display, otherwise improvements 921 may be proposed that are based on policy 240 for different types of image 101. The controller 919 is arranged to provide display luminance, contrast, white points and spatial frequencies to the users' selection. The Visual Security Level is recalculated and the result given to the user. When the performance is adequate in user preference and Visual Security Level the display can proceed to display desired confidential data.

Thus adjustments to the display apparatus 100 and image 101 may be set automatically or recommendations to the user to set values in order to maintain a certain desired or mandated privacy level based on image preferences for the user. For example, a user may have little concern about the colour of an image but may desire large text size, or a user may prefer a well rendered colour image but with reduced luminance. The choice may depend on the application being used and be different for say images and text. Visual Security Level may be set to provide similar performance for both situations, based on said user preference.

In a privacy display apparatus 100 the setting of a privacy mode will have some effect on the viewing experience of the primary user, such as narrowing their viewing freedom or comfort. If this effect is more severe than necessary for the primary user, they may be inhibited from using the privacy display apparatus 100. Advantageously the Visual Security Level may be set at an adequate amount while maintaining minimum changes to the viewing experience of the primary user.

It may be desirable for the display apparatus 100 to provide adequate Visual Security Level when a sensitive document or information is to be displayed. It may further be desirable for the display apparatus 100 to switch to a privacy mode when sensitive data is entered by the primary user.

Figure 11C:
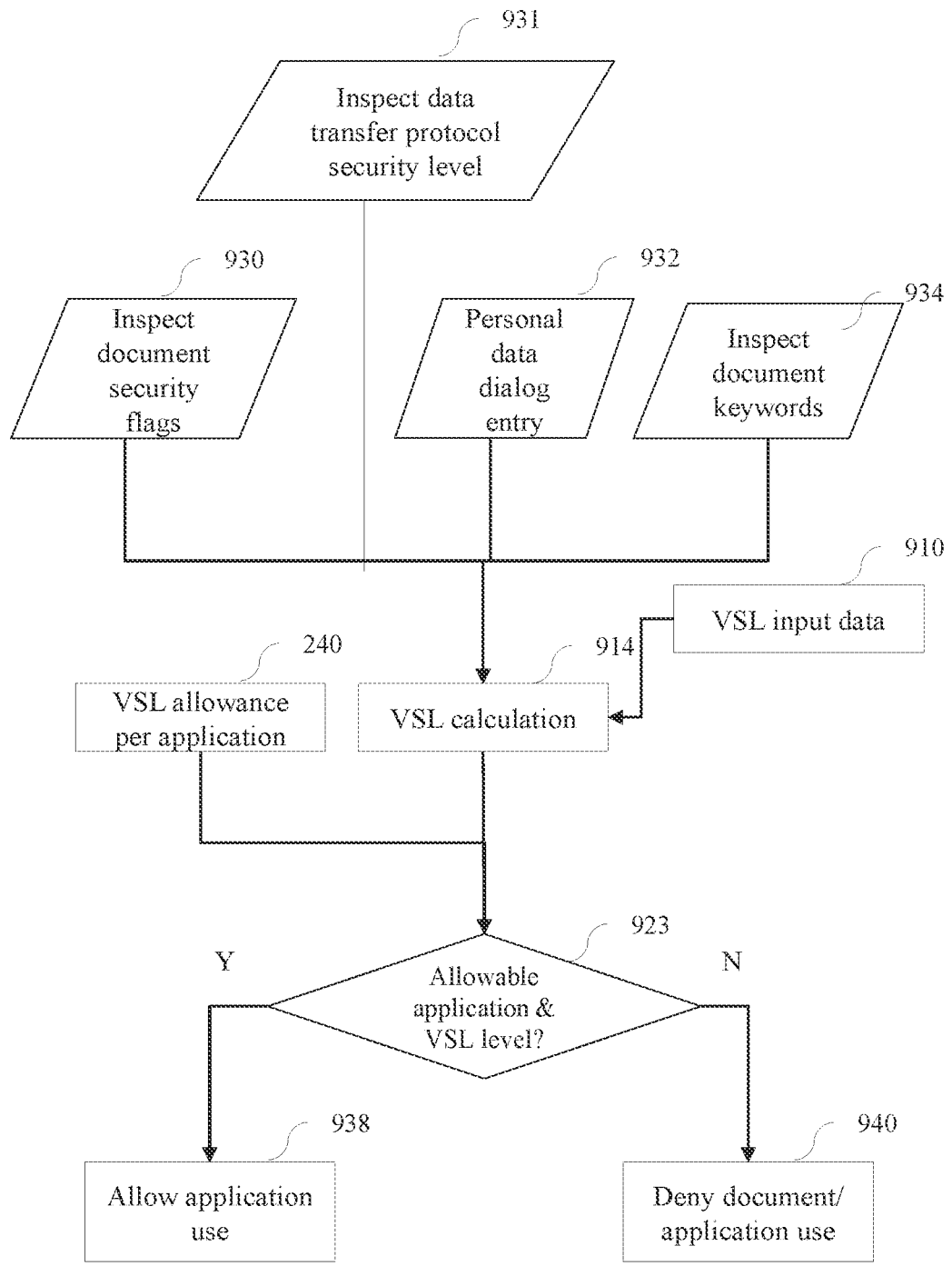
FIG. 11C illustrates a flowchart for control of a privacy display comprising an allowable visual security level for a working document.

FIG. 11C illustrates a flowchart for control of a privacy display comprising an allowable visual security level for a working document.

The control system 500 may selectively operate the display apparatus 100 in the public mode or the privacy mode in response to the context of the application software being executed.

The controller may provide inspection 930 of document security flags, or notification 932 of confidential data entry, for example by noting the use of an appropriate dialog box. The document may also have inspection 934 of document keywords that flag use of privacy operation. The controller may provide inspection 931 of the data transfer security protocol used for example when a web page is accessed. With a secure hypertext transfer protocol for example https is used the display apparatus may be controlled to enter privacy mode. When an open hypertext transfer protocol for example http is used the display apparatus may be controlled to be in public mode.

The control system 500 may process data sources including if personal data dialog entry 1070 is underway such as a software application requesting a user name or password or a date of birth for example. Based on this information the display apparatus 100 may be switched to a privacy mode automatically during data entry and then switched back to the public mode when such data entry is finished. In this way the user is not troubled to manually switch the display in and out of privacy mode. Thus, for certain documents, the Visual Security Level may be adjusted to maximise privacy achieved in comparison to other less sensitive documents. Such adjustment may be by means of luminance control, contrast, colour and spatial frequency adjustment as described elsewhere herein.

The acceptable Visual Security Level policy 240 may be adjusted dependent on the application in use. After calculation of Visual Security Level switch 923 may be arranged to allow 938 the document or application to be used or deny 940 the document or application use.

The display apparatus 100 is capable of executing application software and from the context of that software to recognise if the user is being asked to enter sensitive information such as passwords or personal identity information via for example a dialog box. The display apparatus 100 is capable of executing application software for displaying a document and the display apparatus 100 is arranged to receive user input. In that context the control system 500 may automatically switch the display apparatus 100 in to privacy mode and then automatically switch out of privacy mode when such dialog entry has finished. Typically in a dialog box for a password the typed characters do not appear on the screen so it may not be necessary to switch to privacy mode for this, however the fact that a document may require a password is an indication that the document should be kept secure and that privacy mode should be automatically entered after completion of password entry as the document is opened.

Further the control system 500 selectively operates the display device in the public mode or the privacy mode in response to the content of the document and/or metadata associated with the document. The control system 500 may inspect the document classification or document security flags 1068 or other meta-data and/or may inspect 934 the document for keywords and process these data sources in order to reliably determine if the document about to be displayed on the screen contains sensitive data and before displaying the image, automatically switch the display apparatus 100 to an appropriate privacy level as required by corporate policy and as appropriate for the location determined by the Network ID 201, GPS sensor 206 and ambient light level determined by Ambient Light Sensor 232.

Alternatively, the application running, for example a screen share initiated from a remote person or a video call from a remote person may request the primary user's display apparatus 100 to enter a privacy mode.

The display apparatus 100 may be set to a privacy mode before sensitive data is displayed. The display apparatus 100 may switch to a privacy mode when sensitive data is entered by the primary user or when a sensitive document or information is to be displayed.

Advantageously the overall vulnerability to data loss from snooping is reduced.

The control of a privacy display for use with documents comprising entry of a password will now be further described.

Figure 11D:
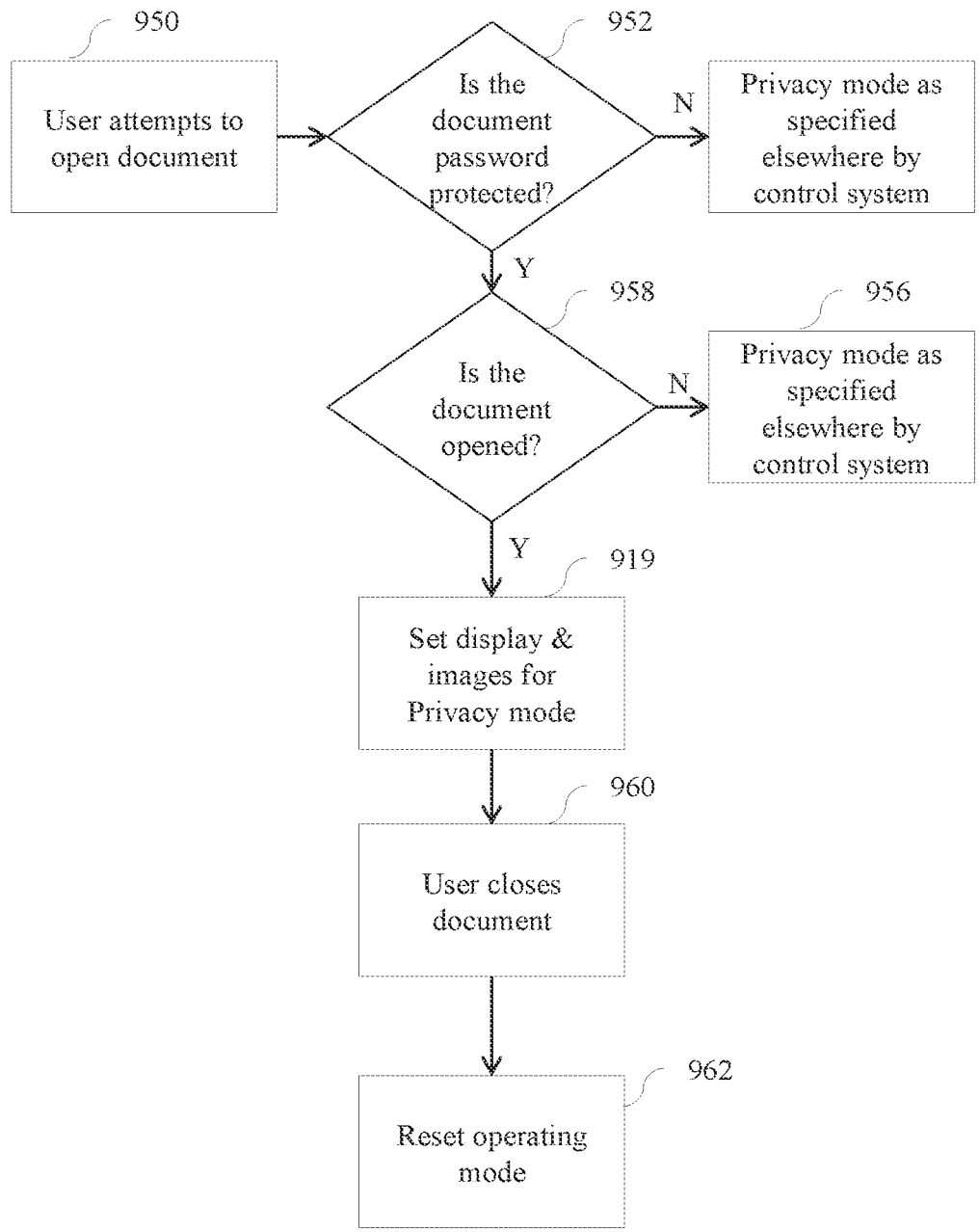
FIG. 11D illustrates a flowchart for control of a privacy display comprising an allowable visual security level for a password protected document.

FIG. 11D illustrates a flowchart for control of a privacy display comprising an allowable visual security level for a password protected document.

In a first step 950 a user may attempt to open a document. In a second step 952 it is determined whether a password protected document is used. If not, then the privacy settings of the display are determined by other policy 240 requirements of the display system.

In step 958 if the document is opened then then the display is operated in privacy mode with control 919. After closing the document in step 960, the privacy operating mode is reset in step 962.

Advantageously, the operation in privacy mode may be determined by password protection documents.

Features of the embodiment of FIG. 11A and FIG. 11B and FIG. 11C and FIG. 11D not discussed in further detail may be assumed to correspond to the features with equivalent reference numerals as discussed above, including any potential variations in the features.

The desirable visibility of images in public mode for an off-axis viewer will now be further described.

Figure 12A:
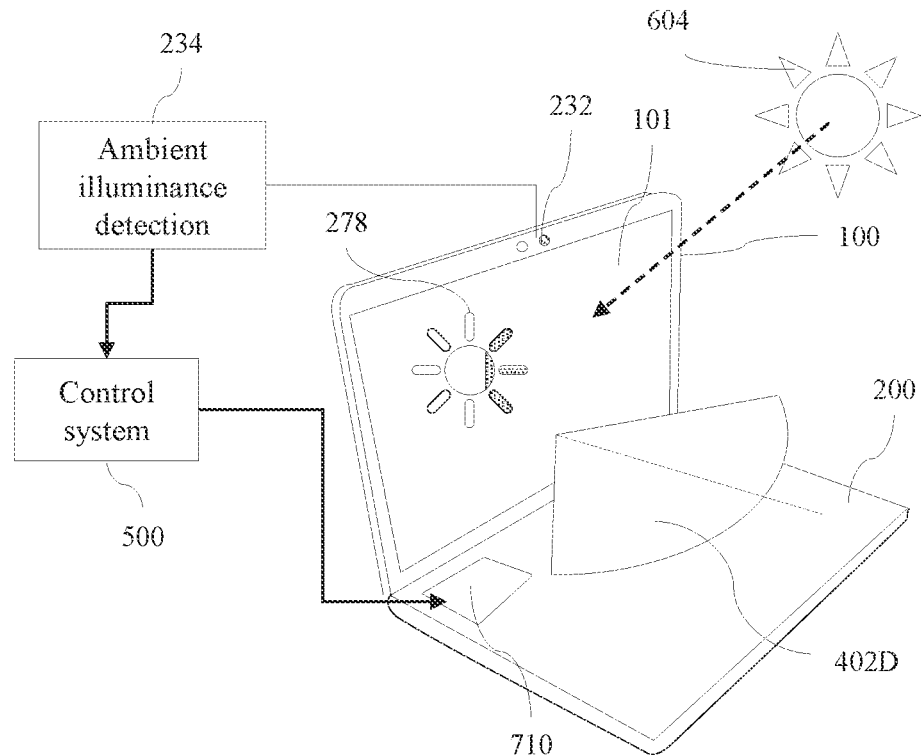
FIG. 12A and FIG. 12B are schematic diagrams illustrating a front view of a privacy display comprising a privacy control system for adjustment of image visibility in public mode.
Figure 12B:
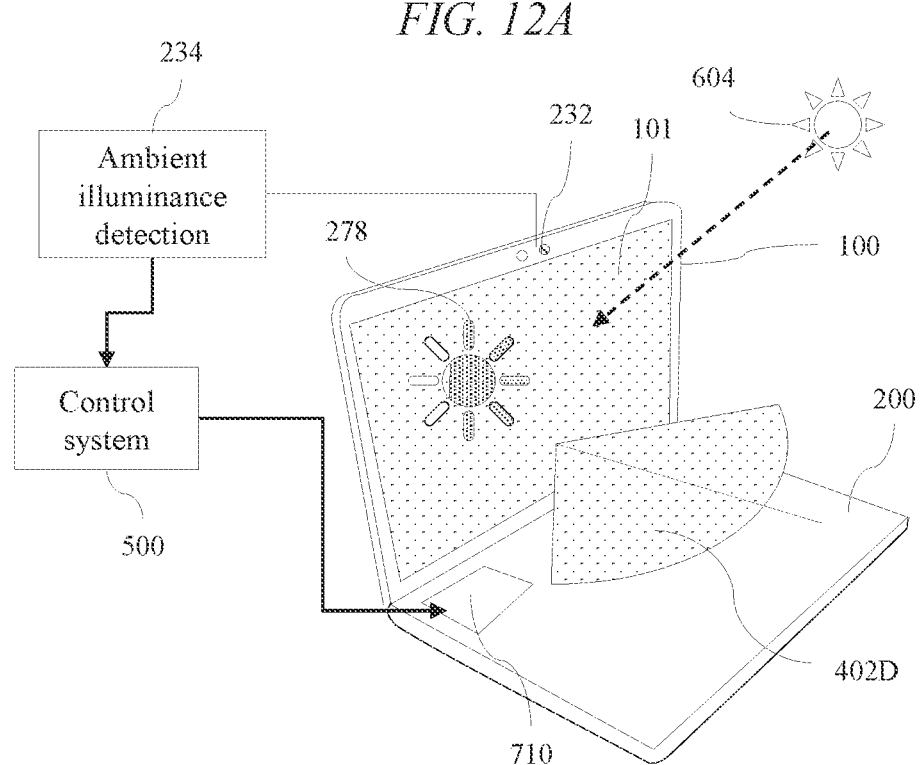

FIGS. 12A-12B are schematic diagrams illustrating a front view of a privacy display comprising a privacy control system for adjustment of image visibility in public mode.

In a high ambient luminance environment as illustrated in FIG. 12A it may be desirable to have a high display luminance setting 278 to overcome reflections from ambient illumination 604. However, in low risk environments, it may still be desirable to provide some low level of privacy and to reduce stray light while achieving increased uniformity to the user in comparison to privacy mode operation with a high Visual Security Level. Such illuminance may reduce the time between charging intervals of the battery.

The control system 500 of the present embodiments may also achieve controllable performance in public mode of operation as illustrated in FIG. 12B, for example with reduced ambient illuminance. In such arrangements, it may be desirable to reduce the off-axis luminance to increase display apparatus 100 efficiency.

Features of the embodiment of FIG. 12A and FIG. 12B not discussed in further detail may be assumed to correspond to the features with equivalent reference numerals as discussed above, including any potential variations in the features.

Further, the output to an off-axis viewer can be adjusted to provide a high quality image with high efficiency as will now be described further.

Figure 13:
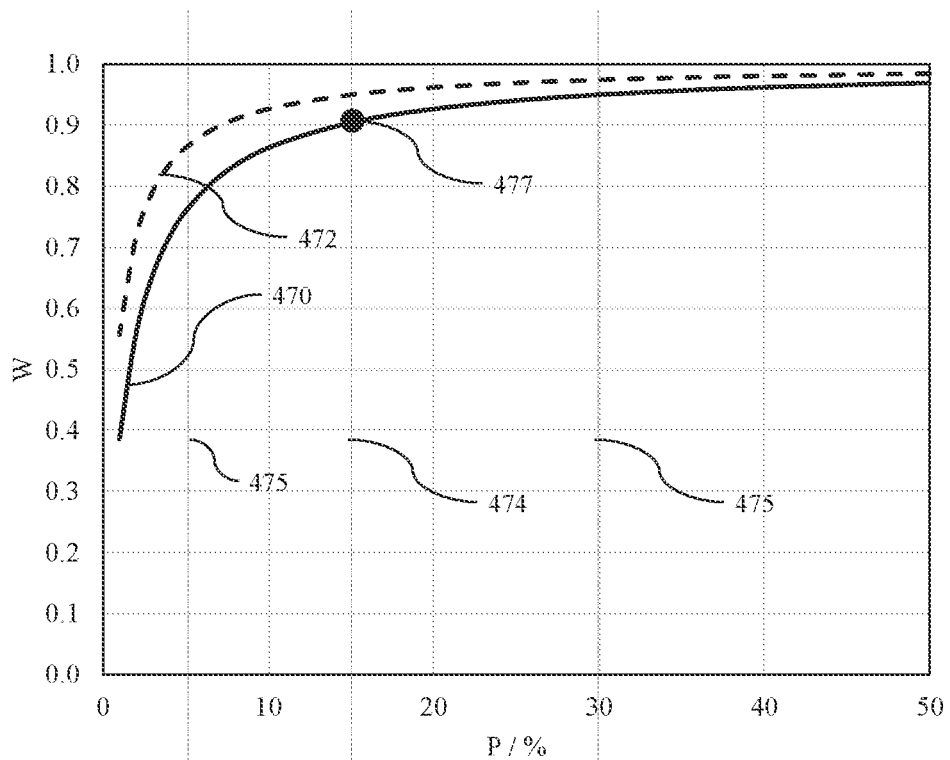
FIG. 13 is a schematic graph illustrating variation of image visibility with off-axis relative luminance of a switchable privacy display operating in public mode.

FIG. 13 is a schematic graph illustrating variation of image visibility, W with off-axis relative luminance P of a switchable privacy display 100 operating in public mode for two different ratios of head-on luminance to illuminance ratios respectively.

Profile 470 illustrates the variation of image visibility W with off-axis relative luminance, P for a ratio of 1 nit head-on luminance per 1 lux of ambient Lambertian illuminance (for example a 300 nit head-on luminance display illuminated by 300 lux) and profile 472 illustrates the variation of W with P for 2 nit head-on luminance per 1 lux of ambient Lambertian illuminance (for example a 300 nit head-on luminance display illuminated by 150 lux).

For desirable wide angle image visibility, a value of W of greater than 0.85, preferably greater than 0.9 and most preferably greater than 0.95 is desirable for an easily observed image. Displays that desirably achieve high image contrast have contrast sensitivities of greater than 90% and preferably greater than 95%.

Thus for typical wide angle displays operating in ambient illumination, it is desirable to provide an off-axis luminance such that the image visibility is slowly varying and above a desirable image visibility such as illustrated by line 474 at which a 1 nit/lux display condition provides an image visibility of 0.9. Preferably a switchable privacy display achieves an off-axis relative luminance for an off-axis viewer (for example at a lateral viewing angle of 45 degrees) of greater than 15% and most preferably an off-axis relative luminance, P of greater than 30% as illustrated by line 475 for an image visibility W of greater than 0.95. As illustrated by line 472, increasing display luminance to 2 nits/lux provides increased image visibility W, as would be expected.

Features of the embodiment of FIG. 13 not discussed in further detail may be assumed to correspond to the features with equivalent reference numerals as discussed above, including any potential variations in the features.

Figure 14:
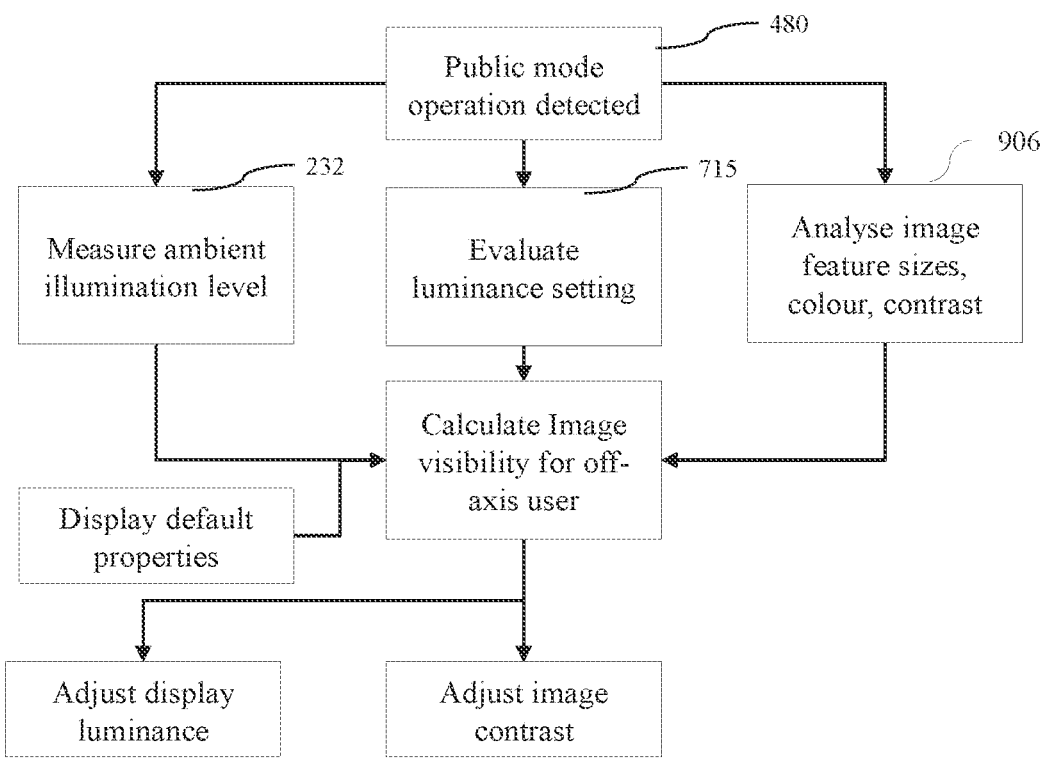
FIG. 14 illustrates a flowchart for control of a switchable privacy display operating in public mode by means of calculation of image visibility for off-axis users.

FIG. 14 illustrates a flowchart for control of a switchable privacy display operating in public mode by means of calculation of image visibility for off-axis users.

After setting 480 of public mode, the ambient light sensor 232 determines ambient illuminance, and illuminance controller 715 can be used to determine display luminance. Optionally contrast, spatial frequency and colour properties of image 101 may be determined by image analysis engine 906.

Control system 482 is used to determine image visibility, W for an off-axis user and the display luminance and image contrast is adjusted to provide an appropriate image visibility that overcomes ambient illuminance.

Advantageously a display with reduced off-axis luminance in public mode may be provided, so that the Visual Security Level when operated in privacy mode is enhanced. Further, the image appearance to an off-axis user in public mode is enhanced.

Features of the embodiment of FIG. 14 not discussed in further detail may be assumed to correspond to the features with equivalent reference numerals as discussed above, including any potential variations in the features.

Examples of displays that are capable of switching between privacy mode and a public mode will now be described.

FIG. 15 is a schematic diagram illustrating a front perspective view a switchable directional display apparatus 100 comprising a backlight 20, switchable liquid crystal retarder 300 and a spatial light modulator 48.

Display device 100 comprises a switchable directional backlight 20 arranged to output light, the backlight 20 comprising a directional waveguide 1; and plural light sources 15 arranged to input light into the waveguide 1, the waveguide 1, a rear reflector and light control films 5 being arranged to direct light from light sources 15, 17 into solid angular extent 402A. Light control films 5 may comprise turning films and diffusers for example.

In the present disclosure a solid angular extent is the solid angle of a light cone within which the luminance is greater than a given relative luminance to the peak luminance. For example the luminance roll-off may be to a 50% relative luminance so that the solid angular extent has an angular width in a given direction (such as the lateral direction) that is the same as the full-width half maximum (FWHM).

The backlight 20 may be arranged to provide an angular light solid angular extent 402A that has reduced luminance for off-axis viewing positions in comparison to head-on luminance.

Display control system 710 is arranged to provide control of light source driver 715.

Luminance of LEDs 15 may be controlled by control system, such that absolute off-axis luminance to a snooper may be controlled.

The spatial light modulator 48 may comprise a liquid crystal display comprising substrates 212, 216, and liquid crystal layer 214 having red, green and blue pixels 220, 222, 224. The spatial light modulator 48 has an input display polariser 210 and an output display polariser 218 on opposite sides thereof. The output display polariser 218 is arranged to provide high extinction ratio for light from the pixels 220, 222, 224 of the spatial light modulator 48. Typical polarisers 210, 218 may be absorbing polarisers such as dichroic polarisers.

Optionally a reflective polariser 208 may be provided between the dichroic input display polariser 210 and backlight 210 to provide recirculated light and increase display efficiency. Advantageously efficiency may be increased.

The optical stack to provide control off-axis luminance will now be described.

Reflective polariser 302, plural retarders 300 and additional polariser 318 are arranged to receive output light from the spatial light modulator 48.

The plural retarders 300 are arranged between the reflective polariser 302 and an additional polariser 318. The polarisers 210, 218, 318 may be absorbing type polarisers such as iodine polarisers while the reflective polariser 302 may be a stretched birefringent film stack such as APF from 3M Corporation or a wire grid polariser.

Plural retarders 300 comprise a switchable liquid crystal retarder 301 comprising a layer 314 of liquid crystal material, and substrates 312, 316 arranged between the reflective polariser 302 and the additional polariser 318. Retarder 300 further comprises a passive retarder 330 as will be described further below.

As described below, plural retarders 300 do not affect the luminance of light passing through the reflective polariser 302, the retarders 300 and the additional polariser 318 along an axis along a normal to the plane of the retarders 300 but the retarders 300 do reduce the luminance of light passing therethrough along an axis inclined to a normal to the plane of the retarders 300, at least in one of the switchable states of the switchable retarder 301. This arises from the presence or absence of a phase shift introduced by the retarders 300 to light along axes that are angled differently with respect to the liquid crystal material of the retarders 300.

Transparent substrates 312, 316 of the switchable liquid crystal retarder 301 comprise electrodes arranged to provide a voltage across a layer 314 of liquid crystal material 414 therebetween. Control system 752 is arranged to control the voltage applied by voltage driver 350 across the electrodes of the switchable liquid crystal retarder 301.

Features of the embodiment of FIG. 15 not discussed in further detail may be assumed to correspond to the features with equivalent reference numerals as discussed above, including any potential variations in the features.

As will be described further below, the additional polariser 318, plural retarders 300 and reflective polariser 302 may be arranged to provide polar control of output luminance and frontal reflectivity from ambient illumination 604.

The optical stack to provide control of off-axis luminance will now be described.

Figure 16A:
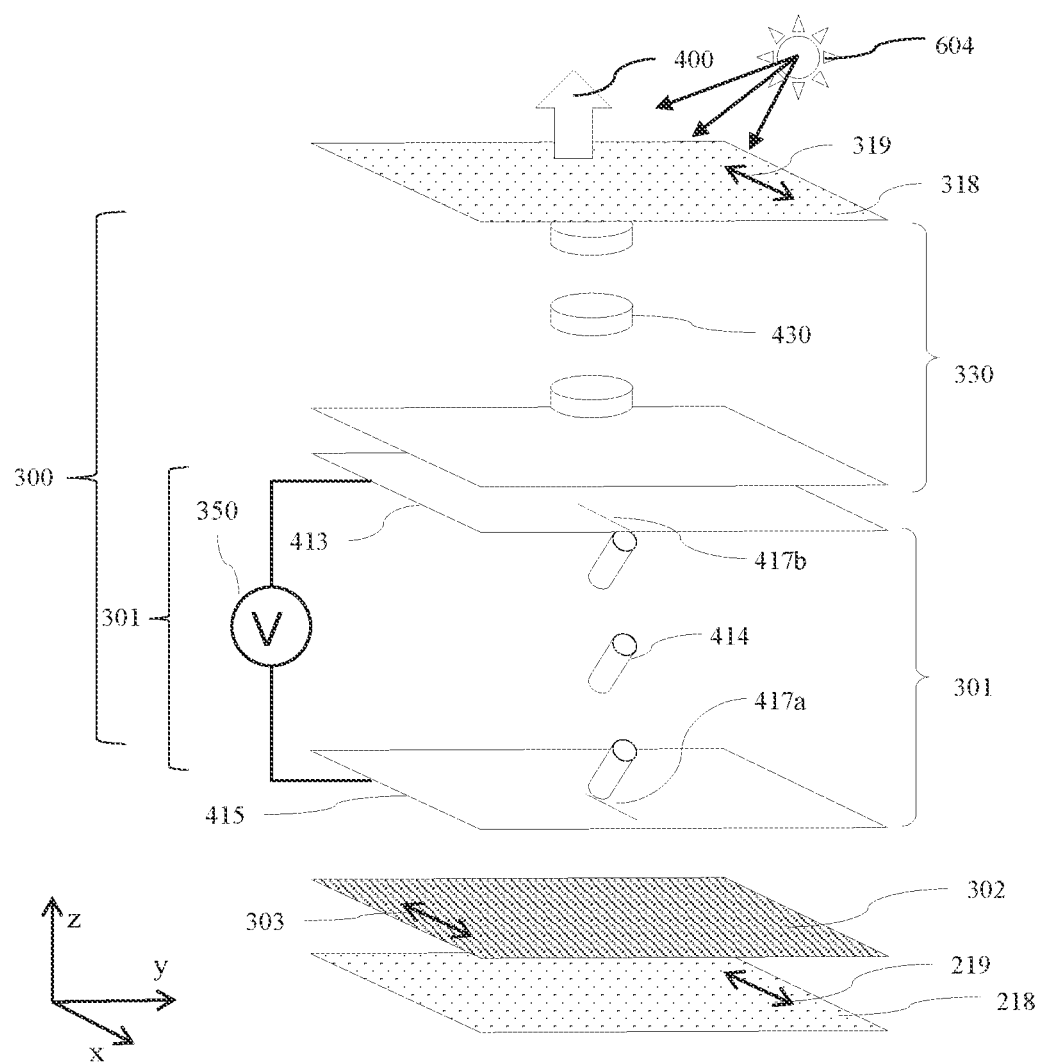
FIG. 16A is a schematic diagram illustrating in perspective side view an arrangement of a switchable liquid crystal retarder comprising a passive negative C-plate compensation retarder in a privacy mode of operation.

FIG. 16A is a schematic diagram illustrating in perspective side view an arrangement of the plural retarders 300 in a privacy mode of operation comprising a negative C-plate passive retarder 330 and homeotropically aligned switchable liquid crystal retarder 301 in a privacy mode of operation. In FIG. 16A, some layers of the optical stack are omitted for clarity. For example the switchable liquid crystal retarder 301 is shown omitting the substrates 312, 316.

The electric vector transmission direction of the reflective polariser 302 is parallel to the electric vector transmission direction of the output polariser 218. Further the electric vector transmission direction 303 of the reflective polariser 302 is parallel to the electric vector transmission direction 319 of the additional polariser 318.

The switchable liquid crystal retarder 301 comprises a layer 314 of liquid crystal material 414 with a negative dielectric anisotropy. The passive retarder 330 comprises a negative C-plate having an optical axis perpendicular to the plane of the retarder 330, illustrated schematically by the orientation of the discotic material 430.

The liquid crystal retarder 301 further comprises transmissive electrodes 413, 415 arranged to control the liquid crystal material, the layer of liquid crystal material being switchable by means of adjusting the voltage being applied to the electrodes. The electrodes 413, 415 may be across the layer 314 and are arranged to apply a voltage for controlling the liquid crystal retarder 301. The transmissive electrodes are on opposite sides of the layer of liquid crystal material 414 and may for example be ITO electrodes.

Alignment layers may be formed between electrodes 413, 415 and the liquid crystal material 414 of the layer 314. The orientation of the liquid crystal molecules in the x-y plane is determined by the pretilt direction of the alignment layers so that each alignment layer has a pretilt wherein the pretilt of each alignment layer has a pretilt direction with a component 417a, 417b in the plane of the layer 314 that is parallel or anti-parallel or orthogonal to the electric vector transmission direction 303 of the reflective polariser 302.

Driver 350 provides a voltage V to electrodes 413, 415 across the layer 314 of switchable liquid crystal material 414 such that liquid crystal molecules are inclined at a tilt angle to the vertical. The plane of the tilt is determined by the pretilt direction of alignment layers formed on the inner surfaces of substrates 312, 316.

In typical use for switching between a public mode and a privacy mode, the layer of liquid crystal material is switchable between two states, the first state being a public mode so that the display may be used by multiple users, the second state being a privacy mode for use by a primary user with minimal visibility by snoopers. The switching may be by means of a voltage being applied across the electrodes. In general such a display may be considered having a first wide angle state and a second reduced off-axis luminance state.

Features of the embodiment of FIG. 16A not discussed in further detail may be assumed to correspond to the features with equivalent reference numerals as discussed above, including any potential variations in the features.

The propagation of polarised light from the output polariser 218 will now be considered for on-axis and off-axis directions for a display operating in privacy mode.

Figure 16B:
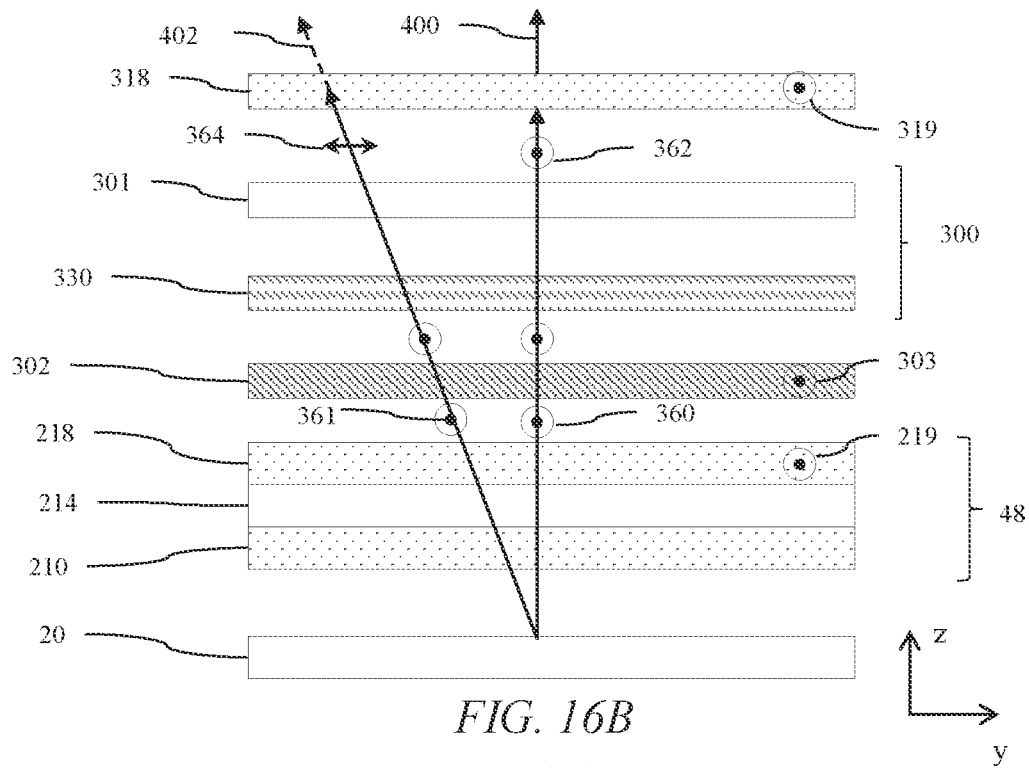
FIG. 16B is a schematic diagram illustrating in side view propagation of output light from a spatial light modulator through the optical stack of FIG. 15 in a privacy mode of operation.
Figure 16C:
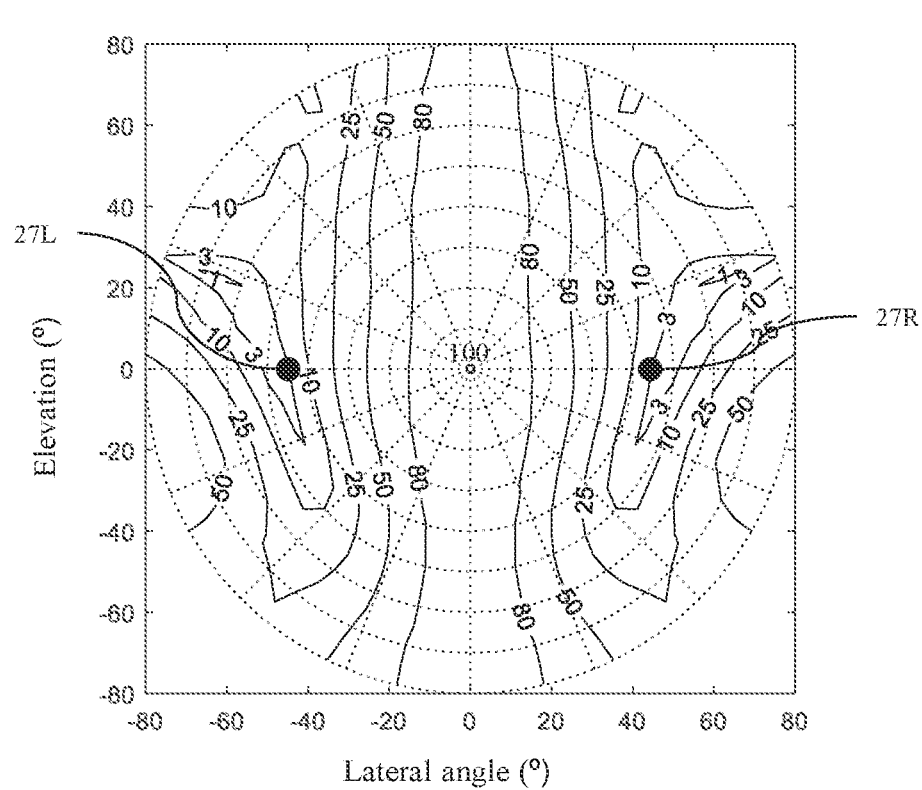
FIG. 16C is a schematic graph illustrating the variation of output luminance with polar direction for the transmitted light rays in FIG. 16B.

FIG. 16B is a schematic diagram illustrating in side view propagation of output light from a spatial light modulator through the optical stack of FIG. 15 in a privacy mode of operation; and FIG. 16C is a schematic graph illustrating the variation of output luminance with polar direction for the transmitted light rays in FIG. 16B.

When the layer 314 of liquid crystal material 414 is driven to operate in the privacy mode, the retarders 300 provide no overall transformation of polarisation component 360 to output light rays 400 passing therethrough along an axis perpendicular to the plane of the switchable retarder, but provides an overall transformation of polarisation component 361 to light rays 402 passing therethrough for some polar angles which are at an acute angle to the perpendicular to the plane of the retarders.

Polarisation component 360 from the output polariser 218 is transmitted by reflective polariser 302 and incident on retarders 300. On-axis light has a polarisation component 362 that is unmodified from component 360 while off-axis light has a polarisation component 364 that is transformed by the retarders 300. At a minimum, the polarisation component 361 is transformed to a linear polarisation component 364 and absorbed by additional polariser 318. More generally, the polarisation component 361 is transformed to an elliptical polarisation component, that is partially absorbed by additional polariser 318.

Thus in a polar representation of transmission by the retarders 300 and additional polariser 318 in a privacy mode, regions of high transmission and regions of low transmission are provided as illustrated in FIG. 16C.

The polar distribution of light transmission illustrated in FIG. 16C modifies the polar distribution of luminance output of the underlying spatial light modulator 48. In the case that the spatial light modulator 48 comprises a directional backlight 20 then off-axis luminance may be further reduced as described above.

Features of the embodiment of FIG. 16B and FIG. 16C not discussed in further detail may be assumed to correspond to the features with equivalent reference numerals as discussed above, including any potential variations in the features.

Advantageously, a privacy display is provided that has low luminance to an off-axis snooper while maintaining high luminance for an on-axis observer. FIG. 16C further illustrates target snooper polar location points 27L, 27R that may be used for evaluation of Visual Security Level as will be described further below.

The operation of the reflective polariser 302 for light from ambient light source 604 will now be described for the display operating in privacy mode.

Figure 16D:
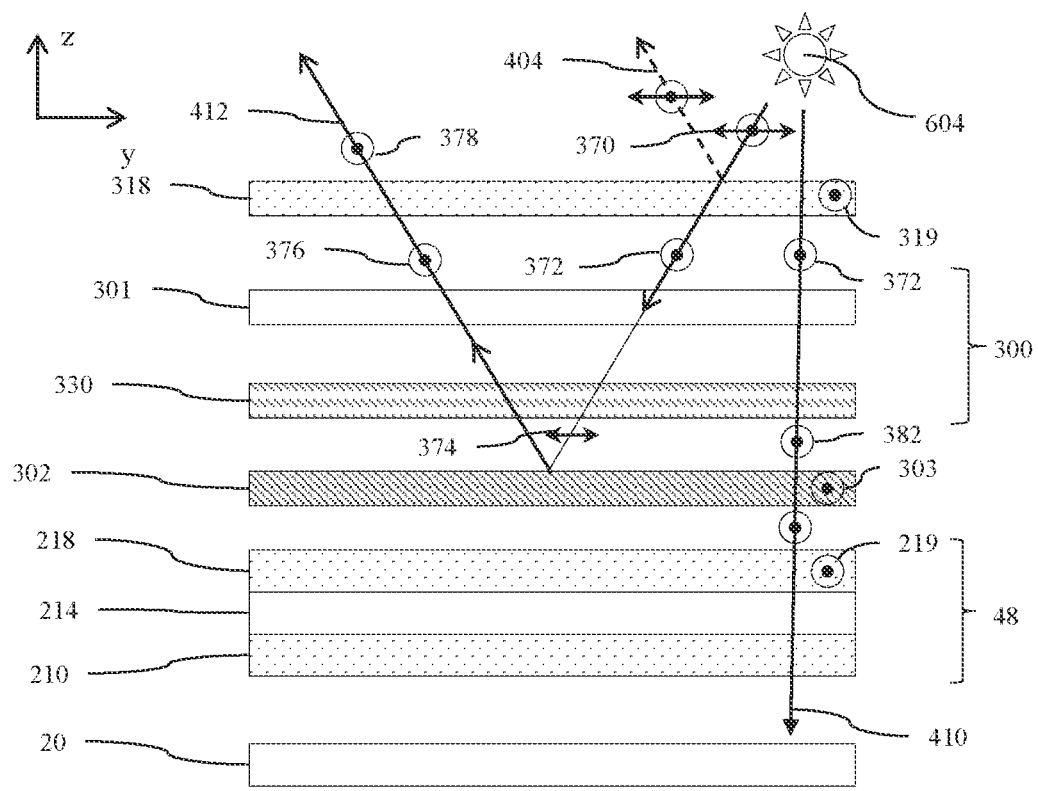
FIG. 16D is a schematic diagram illustrating in top view propagation of ambient illumination light through the optical stack of FIG. 15 in a privacy mode of operation.
Figure 16E:
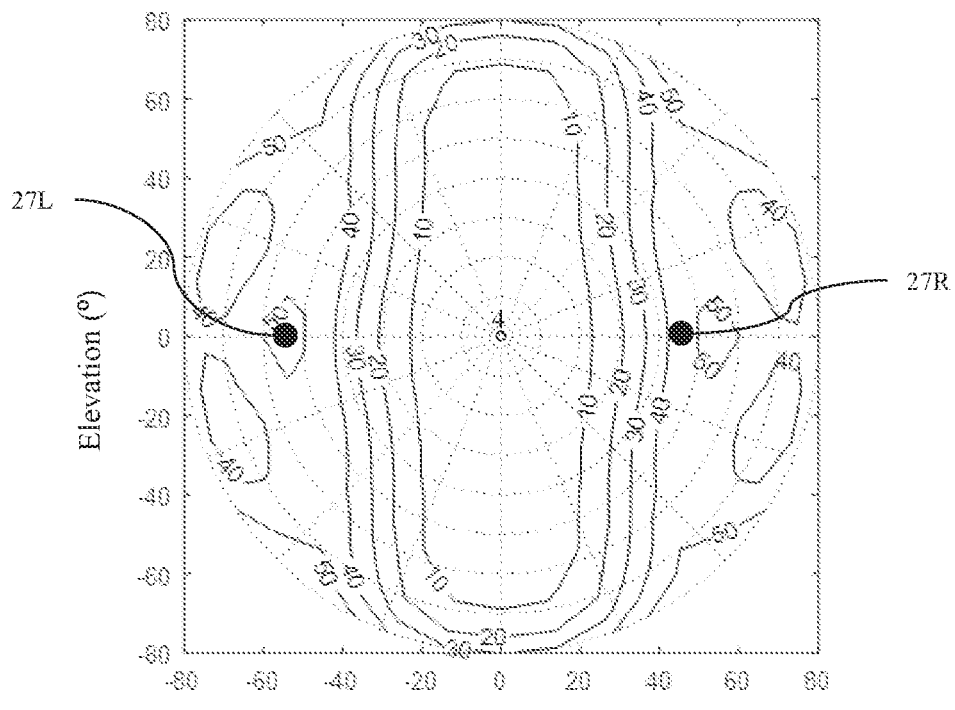
FIG. 16E is a schematic graph illustrating the variation of reflectivity with polar direction for the reflected light rays in FIG. 16D.

FIG. 16D is a schematic diagram illustrating in top view propagation of ambient illumination light through the optical stack of FIG. 15 in a privacy mode of operation; and FIG. 16E is a schematic graph illustrating the variation of reflectivity with polar direction for the reflected light rays in FIG. 16D.

Ambient light source 604 illuminates the display apparatus 100 with unpolarised light. Additional polariser 318 transmits light ray 410 normal to the display surface with a first polarisation component 372 that is a linear polarisation component parallel to the electric vector transmission direction 319 of the additional polariser 318.

In both states of operation, the polarisation component 372 remains unmodified by the retarders 300 and so transmitted polarisation component 382 is parallel to the transmission axis of the reflective polariser 302 and the output polariser 218, so ambient light is directed through the spatial light modulator 48 and lost.

By comparison, for ray 412, off-axis light is directed through the retarders 300 such that polarisation component 374 incident on the reflective polariser 302 may be reflected. Such polarisation component is re-converted into component 376 after passing through retarders 300 and is transmitted through the additional polariser 318.

Thus when the layer 314 of liquid crystal material is in the second state of said two states, the reflective polariser 302 provides no reflected light for ambient light rays 410 passing through the additional polariser 318 and then the retarders 300 along an axis perpendicular to the plane of the retarders 300, but provides reflected light rays 412 for ambient light passing through the additional polariser 318 and then the retarders 300 at some polar angles which are at an acute angle to the perpendicular to the plane of the retarders 300; wherein the reflected light 412 passes back through the retarders 300 and is then transmitted by the additional polariser 318.

The retarders 300 thus provide no overall transformation of polarisation component 380 to ambient light rays 410 passing through the additional polariser 318 and then the retarder 300 along an axis perpendicular to the plane of the switchable retarder, but provides an overall transformation of polarisation component 372 to ambient light rays 412 passing through the absorptive polariser 318 and then the retarders 300 at some polar angles which are at an acute angle to the perpendicular to the plane of the retarders 300.

The polar distribution of light reflection illustrated in FIG. 16E thus illustrates that high reflectivity can be provided at typical snooper locations by means of the privacy state of the retarders 300. Thus, in the privacy mode of operation, the reflectivity for off-axis viewing positions is increased, and the luminance for off-axis light from the spatial light modulator is reduced as illustrated in FIG. 16C.

In the public mode of operation, the control system 710, 752, 350 is arranged to switch the switchable liquid crystal retarder 301 into a second retarder state in which a phase shift is introduced to polarisation components of light passing therethrough along an axis inclined to a normal to the plane of the switchable liquid crystal retarder 301.

By way of comparison, solid angular extent 402D may be substantially the same as solid angular extent 402B in a public mode of operation. Such control of output solid angular extents 402C, 402D may be achieved by synchronous control of the sets 15, 17 of light sources and the at least one switchable liquid crystal retarder 300.

Advantageously a privacy mode may be achieved with low image visibility for off-axis viewing and a large solid angular extent may be provided with high efficiency for a public mode of operation, for sharing display imagery between multiple users and increasing image spatial uniformity.

Additional polariser 318 is arranged on the same output side of the spatial light modulator 48 as the display output polariser 218 which may be an absorbing dichroic polariser. The display polariser 218 and the additional polariser 318 have electric vector transmission directions 219, 319 that are parallel. As will be described below, such parallel alignment provides high transmission for central viewing locations.

A transmissive spatial light modulator 48 arranged to receive the output light from the backlight; an input polariser 210 arranged on the input side of the spatial light modulator between the backlight 20 and the spatial light modulator 48; an output polariser 218 arranged on the output side of the spatial light modulator 48; an additional polariser 318 arranged on the output side of the output polariser 218; and a switchable liquid crystal retarder 300 comprising a layer 314 of liquid crystal material arranged between the at least one additional polariser 318 and the output polariser 218 in this case in which the additional polariser 318 is arranged on the output side of the output polariser 218; and a control system 710 arranged to synchronously control the light sources 15, 17 and the at least one switchable liquid crystal retarder 300.

Control system 710 further comprises control of voltage controller 752 that is arranged to provide control of voltage driver 350, in order to achieve control of switchable liquid crystal retarder 301.

Features of the embodiment of FIG. 16D and FIG. 16E not discussed in further detail may be assumed to correspond to the features with equivalent reference numerals as discussed above, including any potential variations in the features.

Advantageously, a privacy display is provided that has high reflectivity to an off-axis snooper while maintaining low reflectivity for an on-axis observer. As will be described below, such increased reflectivity provides enhanced privacy performance for the display in an ambiently illuminated environment.

Figure 17A:
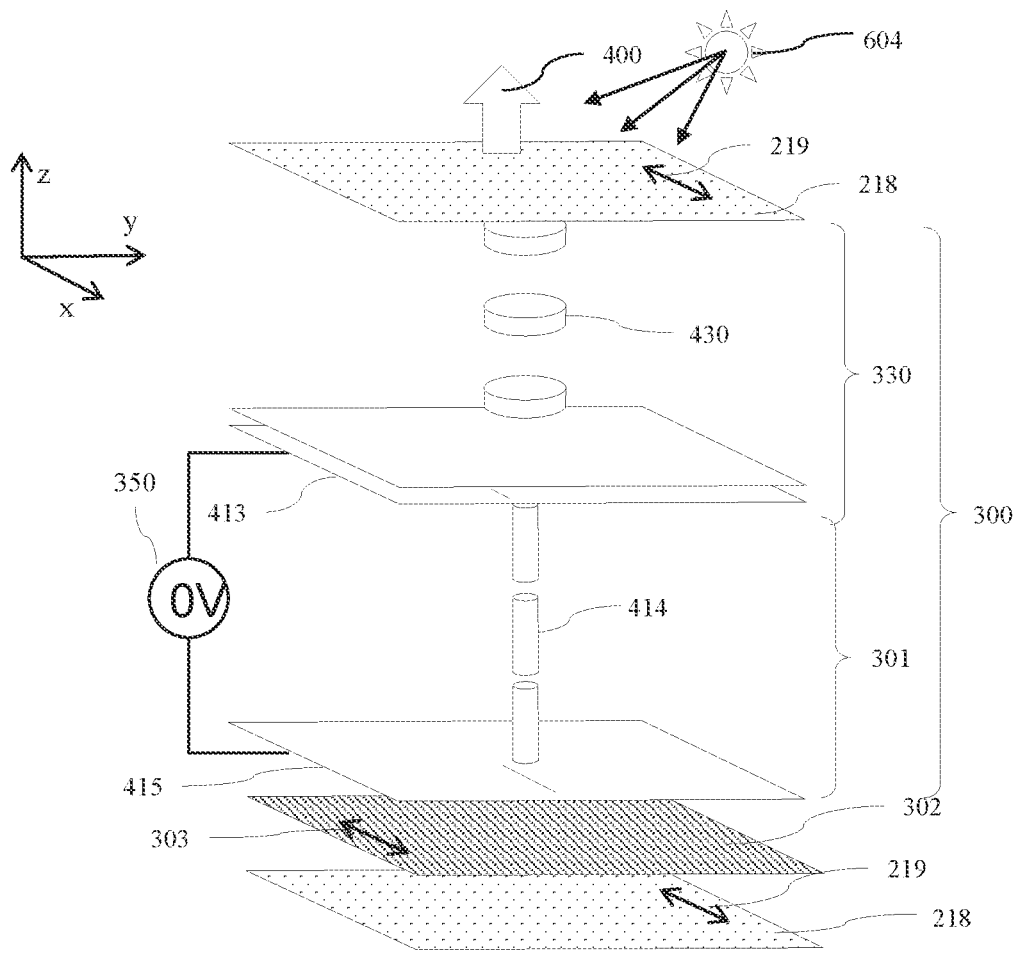
FIG. 17A is a schematic diagram illustrating in perspective side view an arrangement of a switchable retarder in a public mode of operation wherein the switchable retarder comprises a switchable liquid crystal layer with homeotropic alignment and a passive C-plate compensation retarder.

FIG. 17A is a schematic diagram illustrating in perspective side view an arrangement of the retarders 300 in a public mode of operation. In the present embodiment, zero volts is provided across the liquid crystal retarder 301; and TABLE 2 describes an illustrative embodiment for the arrangement of FIG. 17A.

TABLE 2

| | Passive retarder(s) | | Active LC retarder | | | | |
|---|---|---|---|---|---|---|---|
| Mode | Type | Δn.d/ nm | Alignment layers | Pretilt/ deg | Δn.d/ nm | Δε | Voltage/V |
| Wide | Negative C | −700 | Homeotropic | 88 | 810 | −4.3 | 0 |
| Privacy | | | Homeotropic | 88 | | | 2.2 |

The switchable liquid crystal retarder 301 comprises two surface alignment layers disposed on electrodes 413, 415 and adjacent to the layer of liquid crystal material 414 and on opposite sides thereof and each arranged to provide homeotropic alignment in the adjacent liquid crystal material 414. The layer of liquid crystal material 414 of the switchable liquid crystal retarder 301 comprises a liquid crystal material with a negative dielectric anisotropy. The liquid crystal molecules 414 may be provided with a pretilt, for example 88 degrees from the horizontal to remove degeneracy in switching.

In the present embodiments, desirable ranges for retardations and voltages have been established by means of simulation of retarder stacks and experiment with display optical stacks. Ranges for retardances will now be described that provide design configurations for various optical layers.

The layer 314 of liquid crystal material has a retardance for light of a wavelength of 550 nm in a range from 500 nm to 1000 nm, preferably in a range from 600 nm to 900 nm and most preferably in a range from 700 nm to 850 nm; and the retarder 330 further comprises a passive retarder having an optical axis perpendicular to the plane of the retarder, the passive retarder having a retardance for light of a wavelength of 550 nm in a range from −300 nm to −900 nm, preferably in a range from −450 nm to −800 nm and most preferably in a range from −500 nm to −725 nm.

Features of the embodiment of FIG. 17A not discussed in further detail may be assumed to correspond to the features with equivalent reference numerals as discussed above, including any potential variations in the features.

The propagation of polarised light from the output polariser 218 will now be considered for on-axis and off-axis directions for a display operating in public mode for an arrangement of plural retarders 300 as illustrated in FIG. 17A.

Figure 17B:
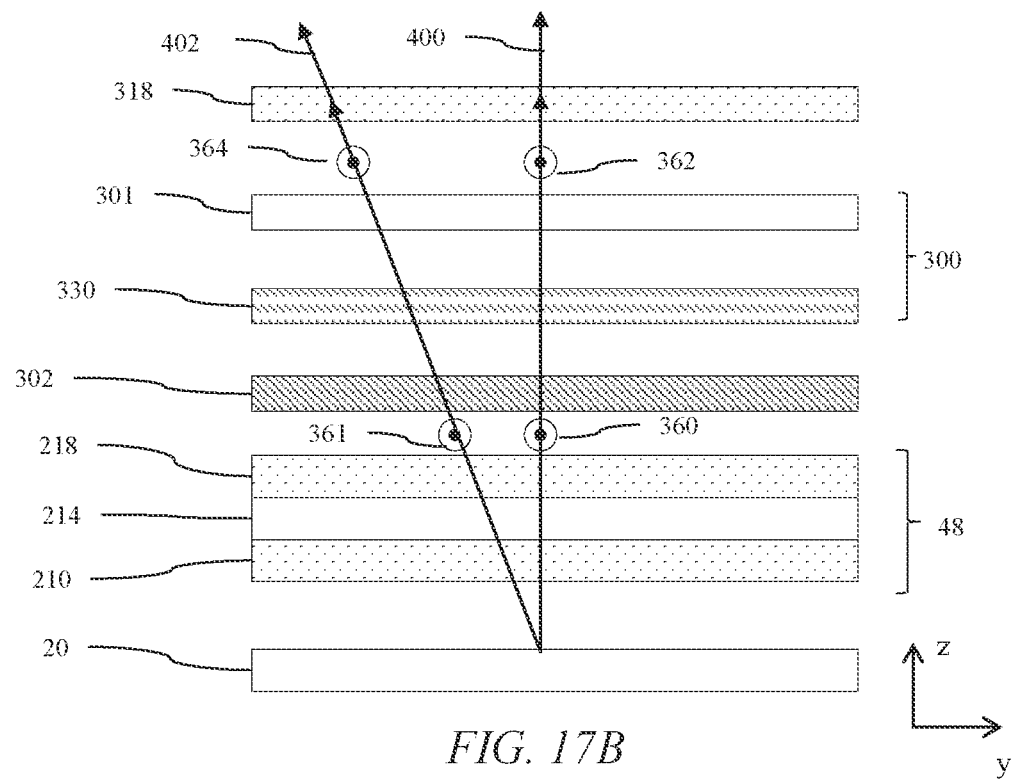
FIG. 17B is a schematic diagram illustrating in side view propagation of output light from a spatial light modulator through the optical stack of FIG. 15 in a public mode of operation.
Figure 17C:
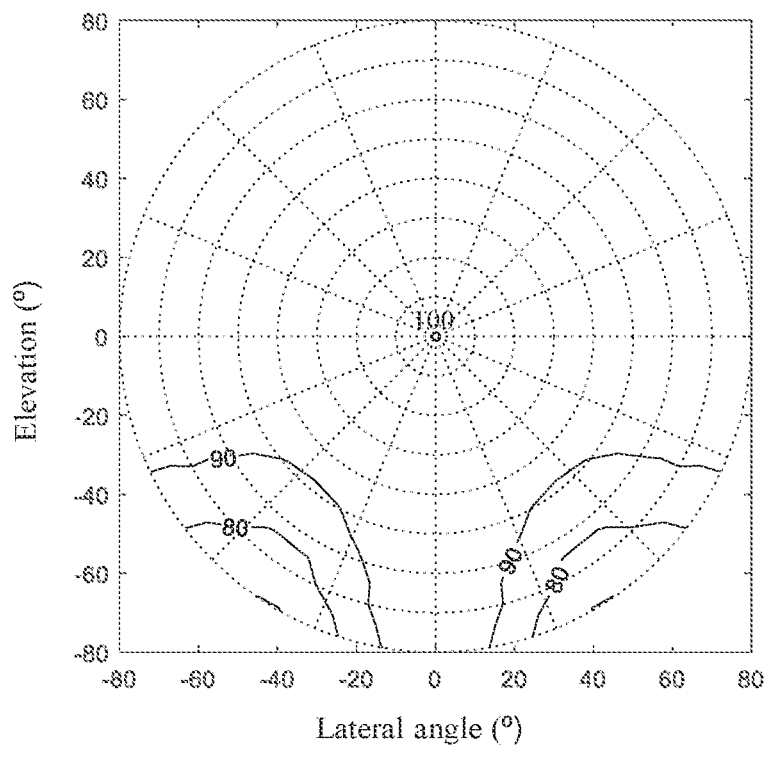
FIG. 17C is a schematic graph illustrating the variation of output luminance with polar direction for the transmitted light rays in FIG. 17B.

FIG. 17B is a schematic diagram illustrating in side view propagation of output light from a spatial light modulator through the optical stack of FIG. 1 in a public mode of operation; and FIG. 17C is a schematic graph illustrating the variation of output luminance with polar direction for the transmitted light rays in FIG. 17B.

Features of the embodiment of FIG. 17B and FIG. 17C not discussed in further detail may be assumed to correspond to the features with equivalent reference numerals as discussed above, including any potential variations in the features.

When the liquid crystal retarder 301 is in a first state of said two states, the retarders 300 provide no overall transformation of polarisation component 360, 361 to output light passing therethrough perpendicular to the plane of the switchable retarder 301 or at an acute angle to the perpendicular to the plane of the switchable retarder 301. That is polarisation component 362 is substantially the same as polarisation component 360 and polarisation component 364 is substantially the same as polarisation component 361. Thus the angular transmission profile of FIG. 17C is substantially uniformly transmitting across a wide polar region. Advantageously a display may be switched to a wide field of view.

Figure 17D:
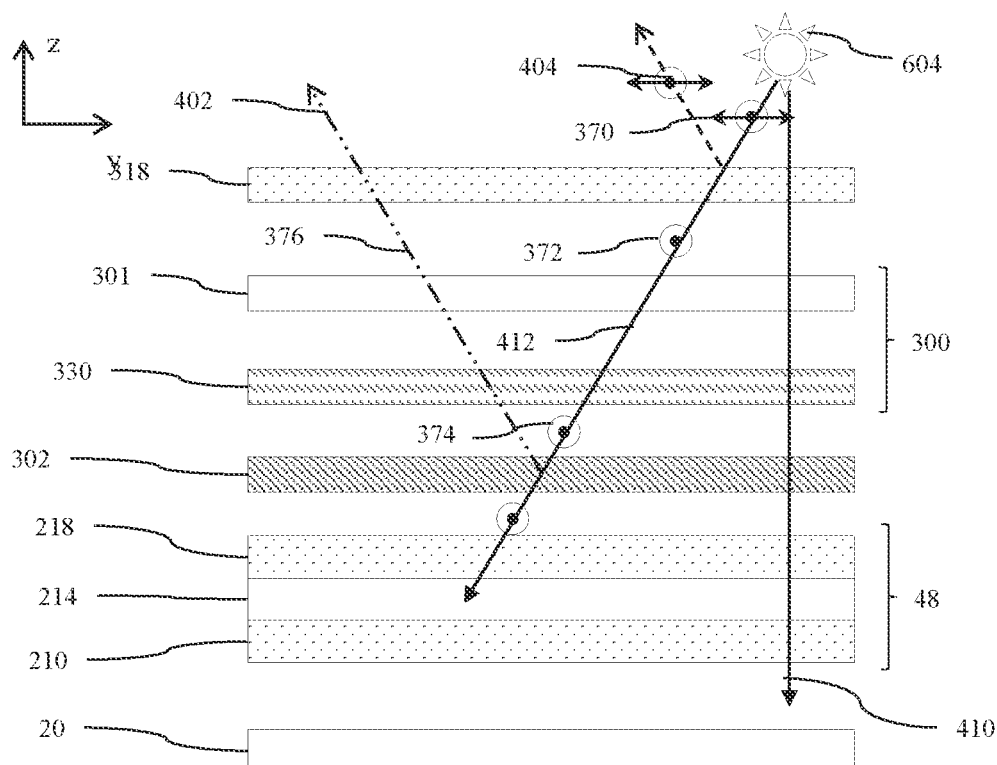
FIG. 17D is a schematic diagram illustrating in top view propagation of ambient illumination light through the optical stack of FIG. 15 in a public mode of operation.
Figure 17E:
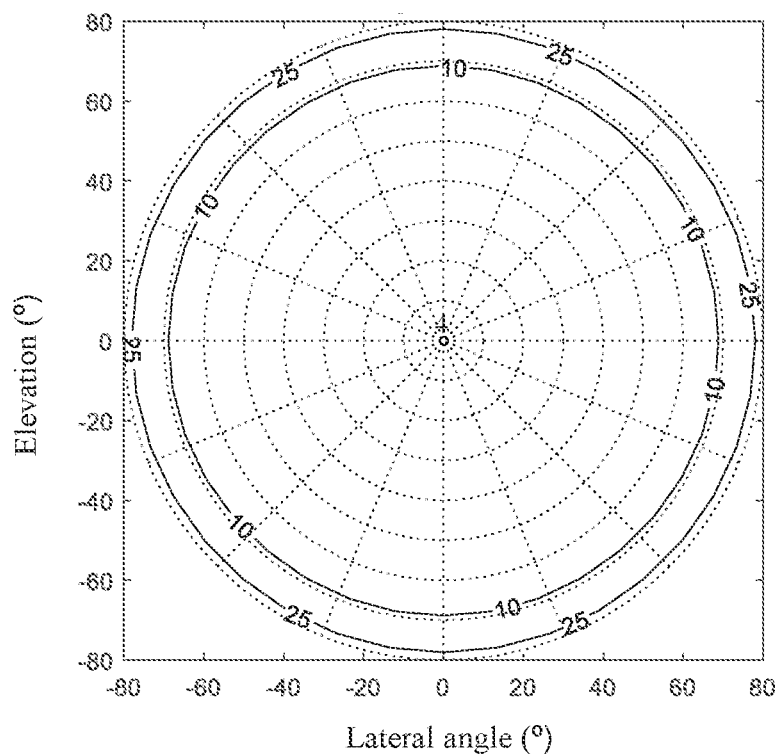
FIG. 17E is a schematic graph illustrating the variation of reflectivity with polar direction for the reflected light rays in FIG. 17D.

FIG. 17D is a schematic diagram illustrating in top view propagation of ambient illumination light through the optical stack of FIG. 1 in a public mode of operation; and FIG. 17E is a schematic graph illustrating the variation of reflectivity with polar direction for the reflected light rays in FIG. 17D.

Thus when the liquid crystal retarder 301 is in the first state of said two states, the retarders 300 provide no overall transformation of polarisation component 372 to ambient light rays 412 passing through the additional polariser 318 and then the retarders 300, that is perpendicular to the plane of the retarders 300 or at an acute angle to the perpendicular to the plane of the retarders 300.

In operation in the public mode, input light ray 412 has polarisation state 372 after transmission through the additional polariser 318. For both head-on and off-axis directions no polarisation transformation occurs and thus the reflectivity for light rays 402 from the reflective polariser 302 is low. Light ray 412 is transmitted by reflective polariser 302 and lost in the display polarisers 218, 210 or the backlight of FIG. 1 or optical isolator 218, 518 in an emissive spatial light modulator 38 of FIG. 2.

Features of the embodiment of FIG. 17D and FIG. 17E not discussed in further detail may be assumed to correspond to the features with equivalent reference numerals as discussed above, including any potential variations in the features.

Advantageously in a public mode of operation, high luminance and low reflectivity is provided across a wide field of view. Such a display can be conveniently viewed with high contrast by multiple observers.

Other types of switchable privacy display will now be described.

A display apparatus 100 that may be switched between privacy and public modes of operation comprises an imaging waveguide and an array of light sources as described in U.S. Pat. No. 9,519,153, which is incorporated by reference herein in its entirety. The imaging waveguide images an array of light sources to optical windows that may be controlled to provide high luminance on axis and low luminance off axis in a privacy mode, and high luminance with a large solid angle cone for public operation.

Switchable angular contrast profile liquid crystal displays are described in Japanese Patent Publ. No. JPH1130783 and in U.S. Patent Publ. No. 2017-0123241, both of which are incorporated by reference herein in their entireties. Such displays may provide out-of-plane tilt of liquid crystal molecules in the liquid crystal layer 214 of a liquid crystal display and may achieve reduced off-axis image contrast in privacy mode of operation. The display apparatus 100 control system 500 may further comprise control of out-of-plane tilt of the liquid crystal molecules.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display apparatus comprising:
a display device arranged to display an image and capable of operating in at least a public mode and a privacy mode, wherein to an on-axis viewer the visibility of the image is such that the image remains visible in both the privacy and public modes, and to an off-axis viewer the visibility of the image is reduced in the privacy mode compared to the public mode;
an ambient light sensor arranged to detect the illuminance level of the ambient light; and
a control system arranged to control the display device, the control system being capable of selectively operating the display device in the public mode or the privacy mode,
wherein the control system is arranged to selectively control luminance of the displayed image in the public mode in accordance with a public transfer function that relates varying levels of luminance to detected levels of the ambient light and to selectively control luminance of the displayed image in the private mode in accordance with a privacy transfer function that relates varying levels of luminance to detected levels of the ambient light in the privacy mode, the privacy transfer function being different from the public transfer function.

2. The display apparatus according to claim 1, wherein the display apparatus is arranged to connect to a network and the control system is arranged to selectively operate the display device in the public mode or the privacy mode in response to the nature of the network.

3. The display apparatus according to claim 1, wherein the display apparatus is arranged to receive the identity of the user and the control system is arranged to selectively operate the display device in the public mode or the privacy mode in response to the received identity of the user.

4. The display apparatus according to claim 1, wherein the display apparatus comprises a location system arranged to detect the location of the display apparatus and the control system is arranged to selectively operate the display device in the public mode or the privacy mode in response to the detected location.

5. The display apparatus according to claim 1, wherein the display apparatus is arranged to receive user input and the control system is arranged to selectively operate the display device in the public mode or the privacy mode in response to the received user input.

6. The display apparatus according to claim 1, wherein the control system is arranged to selectively operate the display device in the public mode or the privacy mode in response to the detected level of the ambient light.

7. The display apparatus according to claim 1, wherein the control system is arranged to selectively control any one or more of the luminance, contrast, white point and spatial frequency of the displayed image to maintain a selected privacy level in response to the detected level of the ambient light.

8. The display device according to claim 1, wherein the public transfer function relates higher levels of luminance to detected levels of the ambient light than the privacy transfer function.

9. The display apparatus according to claim 1, wherein the privacy transfer function maintains a relationship $Y0/I\theta \geq 1$ lux/nit where $Y0$ is the maximum output luminance of the display apparatus and $I\theta$ is the detected ambient light level.

10. The display apparatus according to claim 1, wherein the privacy transfer function maintains a relationship $Y0 \leq Y0_{lim}$, where $Y0$ is the maximum output luminance of the display apparatus and $Y0_{lim}$ is given by the equation:

$$Y0_{lim} = \frac{R\theta + V_{lim} * K\theta}{(V_{lim} - 1) * P\theta}$$

where $V_{lim}$ has a value of 10, $R\theta$ is the reflected ambient illuminance at an observation angle $\theta$ of 45 degrees laterally and zero degrees in elevation from the normal to the display apparatus, $K\theta$ is the display black state luminance at the observation angle, and $P\theta$ is the relative luminance at the observation angle $\theta$ compared to the maximum display output luminance $Y0$.

11. The display apparatus according to claim 1, wherein the display apparatus is arranged to receive time data input and ambient light sensor input and the control system is arranged to selectively operate the display device in the public mode or the privacy mode in response to the received time input and ambient light sensor input in order to reduce light pollution generated by the display apparatus.

12. A display apparatus according to claim 1, wherein the display apparatus is capable of executing application software and the control system is arranged to selectively operate the display device in the public mode or the privacy mode in response to the context of the application software being executed.

13. The display apparatus according to claim 12, wherein the display apparatus is capable of executing application software for displaying a document, and the control system is arranged to selectively operate the display device in the public mode or the privacy mode in response to the content of the document and/or metadata associated with the document.

14. The display apparatus according to claim 13, wherein the content and/or metadata includes the security status of the transfer protocol of the document and determining the transfer protocol to be Hypertext Transfer Protocol or Hypertext Transfer Protocol Secure.

* * * * *